United States Patent
He et al.

(10) Patent No.: US 11,070,322 B2
(45) Date of Patent: Jul. 20, 2021

(54) DEVICE AND METHOD TO ALLOW CROSS-TRANSMISSION TIME INTERVAL (TTI) SWITCHING AND HYBRID AUTOMATIC REPEAT REQUEST (HARQ) OPERATION IN A NEW RADIO NETWORK

(71) Applicant: Apple Inc., Cupertino, CA (US)

(72) Inventors: Hong He, Sunnyvale, CA (US); Ajit Nimbalker, Fremont, CA (US); Gang Xiong, Portland, OR (US); Dae Won Lee, Portland, OR (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/476,528

(22) PCT Filed: Mar. 22, 2018

(86) PCT No.: PCT/US2018/023895
§ 371 (c)(1),
(2) Date: Jul. 8, 2019

(87) PCT Pub. No.: WO2018/175815
PCT Pub. Date: Sep. 27, 2018

(65) Prior Publication Data
US 2019/0356426 A1    Nov. 21, 2019

Related U.S. Application Data

(60) Provisional application No. 62/475,460, filed on Mar. 23, 2017.

(51) Int. Cl.
*H04L 1/18* (2006.01)
*H04W 72/04* (2009.01)
*H04W 84/04* (2009.01)

(52) U.S. Cl.
CPC .......... *H04L 1/1822* (2013.01); *H04L 1/1835* (2013.01); *H04W 72/042* (2013.01); *H04W 72/0446* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2009/0232050 A1 | 9/2009 | Shen et al. | |
| 2013/0051289 A1* | 2/2013 | Hsieh | H04L 1/1845 370/280 |

(Continued)

FOREIGN PATENT DOCUMENTS

WO    2015142553 A1    9/2015

OTHER PUBLICATIONS

PCT International Preliminary Report on Patentability issued in International Patent Application No. PCT/US2018/023895, dated Sep. 24, 2019; 11 pages.

(Continued)

*Primary Examiner* — Saba Tsegaye
(74) *Attorney, Agent, or Firm* — Eschweiler & Potashnik, LLC

(57) ABSTRACT

A device of a User Equipment (UE) includes a soft buffer including a plurality of soft buffer partitions to store a plurality of soft bits for a number of hybrid automatic retransmission request (HARQ) processes, wherein the number of HARQ processes includes first HARQ processes corresponding to a first Time Transmission Interval (TTI) Type of a first duration (TTI Type 1), and second HARQ processes corresponding to a second TTI Type of a second duration (TTI Type 2) shorter than the first duration. The device further includes processing circuitry to communicate with a base station in a cellular network, the processing (Continued)

circuitry further to effect a dynamic switching between a TTI Type 1 communication mode and a TTI Type 2 communication mode, and to selectively access the soft buffer partitions to perform, based on the switching, at least one of the first HARQ processes and the second HARQ processes.

22 Claims, 12 Drawing Sheets

(56) References Cited

U.S. PATENT DOCUMENTS

| | | |
|---|---|---|
| 2014/0161090 A1 | 6/2014 | Lee et al. |
| 2015/0180616 A1 | 6/2015 | Lee et al. |
| 2015/0256296 A1 | 9/2015 | Hsieh |
| 2016/0204907 A1 | 7/2016 | Chen et al. |
| 2018/0213530 A1* | 7/2018 | Mochizuki ........ H04W 72/0446 |
| 2018/0234359 A1* | 8/2018 | Hosseini ............. H04L 1/1861 |
| 2019/0021072 A1* | 1/2019 | Horiuchi ........... H04W 72/0446 |

OTHER PUBLICATIONS

PCT International Search Report and Written Opinion issued in International Patent Application No. PCT/US2018/023895, dated Jul. 11, 2018; 13 pages.

* cited by examiner

US 11,070,322 B2

DEVICE AND METHOD TO ALLOW CROSS-TRANSMISSION TIME INTERVAL (TTI) SWITCHING AND HYBRID AUTOMATIC REPEAT REQUEST (HARQ) OPERATION IN A NEW RADIO NETWORK

CROSS REFERENCE TO RELATED APPLICATION

This application is a national stage application under 35 U.S.C. § 371 of PCT International Application Serial No. PCT/US2018/023895, filed on Mar. 22, 2018, and entitled DEVICE AND METHOD TO ALLOW CROSS-TRANSMISSION TIME INTERVAL (TTI) SWITCHING AND HYBRID AUTOMATIC REPEAT REQUEST (HARQ) OPERATION IN A NEW RADIO NETWORK, which claims the benefit of and priority from U.S. Provisional Patent Application No. 62/475,460 entitled "APPARATUS AND METHOD FOR HARQ OPERATION WITH TTI TYPES SWITCHING," filed Mar. 23, 2017, the entire disclosures of which are incorporated herein by reference.

TECHNICAL FIELD

This disclosure generally relates to the use of devices operable to communicate in a Long-Term Evolution (LTE) or New Radio (NR) network that are further able to switch between a first longer Transmission Time Intervals (TTI) and a shortened TTI (sTTI) with a mini-slot duration.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third-generation partnership project (3GPP) long term evolution (LTE) and New Radio (NR), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) Long Term Evolution (LTE) and NR systems, the node may be a combination of Evolved Universal Terrestrial Radio Access Network (E-UTRAN) Node Bs (also commonly denoted as evolved Node Bs, enhanced Node Bs, eNodeBs, or eNodeBs) and Radio Network Controllers (RNCs), which communicates with the wireless device, known as a user equipment (UE). The downlink (DL) transmission may be a communication from the node (e.g., eNodeB) to the wireless device (e.g., UE), and the uplink (UL) transmission may be a communication from the wireless device to the node.

In LTE and NR, data may be transmitted from the eNodeB to the UE via a physical downlink shared channel (PDSCH). A physical downlink control channel (PDCCH) may be used to provide control information regarding a downlink PDSCH. A physical uplink control channel (PUCCH) may be used to acknowledge that data was received. Downlink and uplink channels or transmissions may use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. Frequency Division Multiplexing (FDM) is a Type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission may operate using different frequency carriers (i.e. separate carrier frequency for each transmission direction). In FDD, interference may be avoided because the downlink signals use a different frequency carrier from the uplink signals.

DETAILED DESCRIPTION

Figure 1:
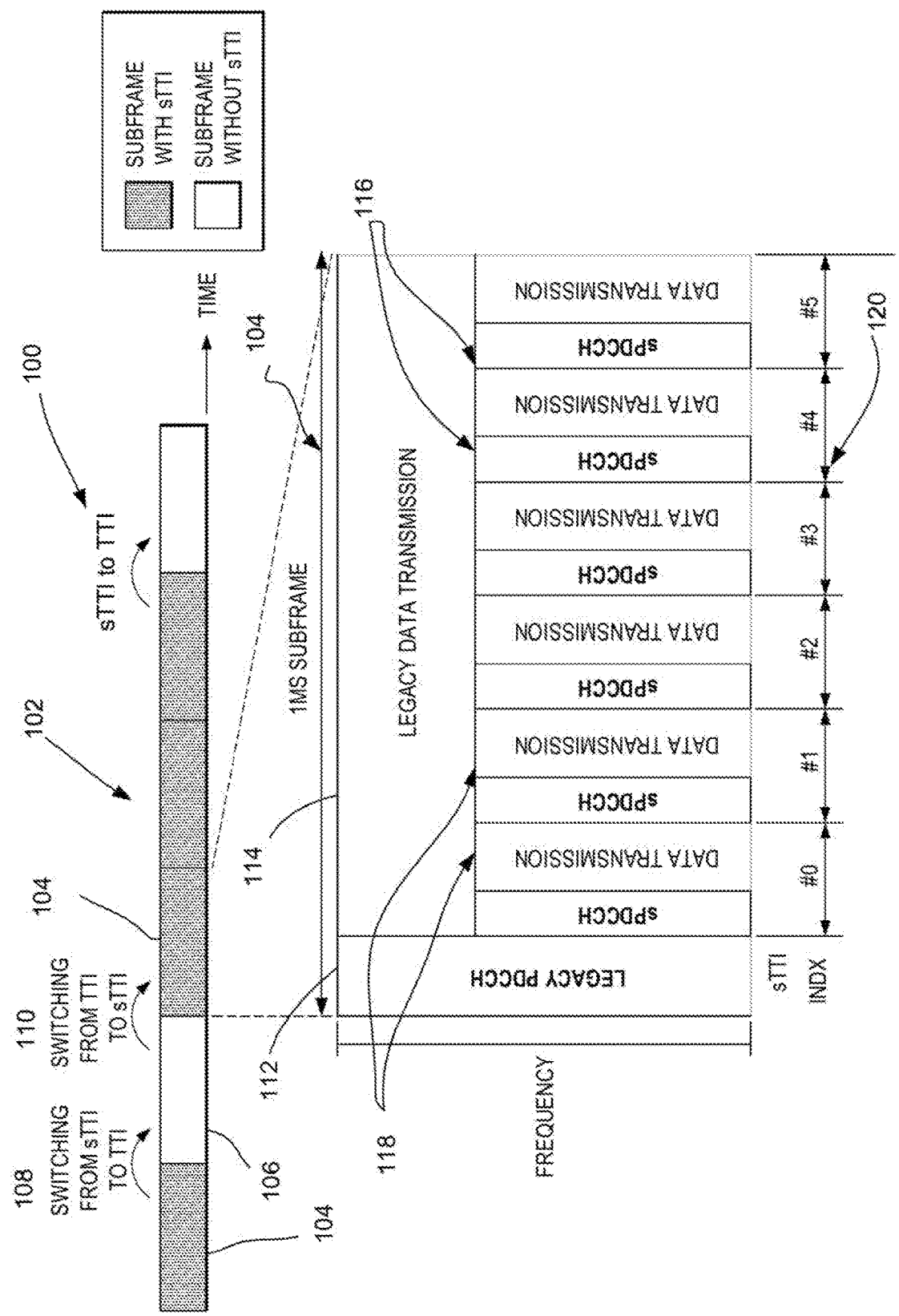
FIG. 1 is a signaling diagram in the time and frequency domains showing a number of sTTI subframes and a number of TTI subframes 106 corresponding to to DL data transmissions by a base station.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or NR will provide access to information and sharing of data anywhere, anytime by various users and applications. NR is expected to be a unified network/system that targets to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATS) to enrich people's lives with better, simpler and more seamless wireless connectivity solutions. NR will enable everything connected by wireless and deliver fast, rich content and services.

Embodiments of the instant disclosure are related in general to Rel-15 shortened Transmission Time Interval (TTI) Work Item Description (WID), and focus on the PHY design.

A HARQ (Hybrid Automatic Repeat Request (HARQ) mechanism in LTE and NR is used to ensure a successful delivery of data transmissions from the Node B's MAC layer to the UE's MAC layer or vice versa. A maximum 8 HARQ processes may currently be run in a given legacy LTE network. A HARQ process may be run by a MAC layer and may be controlled by a PHY layer of each system within the legacy LTE network. LTE utilizes incremental redundancy HARQ with a ⅓ turbo encoder used for forward error correction. The use of incremental redundancy in a HARQ process results in a data retransmission containing information different from information in a previous corresponding data (re)transmission, such that, at every data retransmission, the receiver can gain extra information about the data being transmitted. Thus, in an incremental redundancy HARQ process, some additional redundant information bits are transmitted in each re-transmission, and where the receiver needs to decode the bits on each re-transmission. If an existing HARQ process involves a data transmission at time n millisecond, then it will stop and not transmit any bit until a time n+4 milliseconds for ACK/NACK in the HARQ transmission. Multiple HARQ processes may therefore be used to run in parallel to achieve high throughput and spectral efficiency.

HARQ is a technique that enables faster recovery from errors in communication networks by storing corrupted data packets in the receiving device rather than discarding them. Even if retransmitted data packets have errors, a good data packet may be derived from the combination of bad ones at the receiver. Instead of re-transmitting the same portion of the codeword, different redundancy versions can be re-transmitted, yielding an extra gain over Chase Combining. Ideally, a full soft buffer is made available at the receiver side such that received soft values/bits for the entire codeword may be stored. A soft bit is a representation of a measure of how likely it is that the transmitted bit is a 0 or 1. However, due to the UE complexity and cost concerns, the soft buffer size in a UE is limited.

As noted previously, in a LTE FDD system, up to 8 HARQ processes are available for the legacy n+4 HARQ timeline. Each HARQ process may further comprise up to two sub-processes for supporting dual-codeword MIMO transmissions. Each UE divides the available soft buffer equally into the configured number of HARQ processes. Each of the divided soft buffers may be used to store soft values of the received corrupted bits of the codewords. In case of dual-codeword MIMO transmission, the divided soft buffer is further divided equally to store the soft values of the two portions of the received corrupted bits of the codewords.

As of LTE Rel-14, a fixed TTI length of 1 ms with 12 or 14 symbols has been provided. However, in order to reduce the Transmission Control Protocol (TCP) packet latency and to maximize the throughput of the system, 3GPP has initiated work in LTE Release 15 (Rel-15) by introducing a shorter or shortened TTI (sTTI) compared to TTI length of 1 ms for a data transmission. The sTTI may be implemented by splitting the 1 ms subframe or TTI into multiple segments of a duration shorter than a subframe, i.e. 2-symbols or one slot in the time domain Each of the sTTIs may be scheduled separately with a new control channel, i.e. a shortened PDCCH (sPDCCH). In particular, it was agreed in Rel-15 that a sTTI capable UE may be dynamically scheduled with unicast PDSCH with a legacy TTI length and/or unicast sPDSCH with a sTTI length with a subframe to subframe granularity. The above implies that a LTE Rel-15 UE configured with sTTI operations may be quickly and dynamically switched between sTTI and legacy 1 ms TTI for DL data transmission depending on the situation.

An example of the above is provided in FIG. 1. As seen in FIG. 1, a signaling diagram 100 is provided in the time and frequency domain. The signaling diagram shows a number of subframes 102 each having a 1 ms duration, with the shown signaling diagram showing a number of sTTI subframes 104 (shown by the shaded subframes) and a number of TTI subframes 106 (shown by the non-shaded subframes). The shown subframes correspond to DL data transmissions by a base station, such as, by way of example only, an evolved Node B (eNodeB) or a New Radio (NR) evolved Node B (gNodeB), and depict the base station switching from one TTI regime to another, for example switching at 108 from a sTTI subframe 104 to a TTI subframe 106, and switching again at 110 from a TTI subframe 106 to a sTTI subframe 104.

The content of a sTTI-based subframe 104, which occupies a 1 ms subframe duration, is shown in exploded format at the bottom portion of FIG. 1. sTTI-based subframe 104 may include a legacy PDCCH 112 including Downlink Control Information signal (DCI) for the legacy data transmission 114 which occupies a portion of the frequency occupied by the sTTI-based subframe 104. The sTTI-based subframe 104 may further include, at a sub-band of a frequency band thereof, a series of sTTIs with indices S #0 to S #5, each sTTI including a sPDCCHs 116 and corresponding sPDSCHs 118 pair, each sTTI occupying, in the shown example, 2 symbols. Thus, each of the sTTIs may be scheduled separately with a new control channel, sPDCCH.

For sTTI operation, the minimum timing for the 2-symbol sTTI is likely to be larger than n+4, e.g. n+6, and, consequently the HARQ process number may have to be larger than that in the legacy LTE system, i.e. 8 HARQ processes. For example, the number of HARQ processes to accommodate the sTTI additional slots may be up to 12.

When switching from sTTI to 1 ms legacy TTI, the number of available HARQ processes may be changed, for example reduced, such as reduced from 12 to 8. In addition, newer versions of cellular standards, such as, for example, 5G New Radio (NR), contemplate the provision of UEs configured to provide differing TTI lengths (i.e. such as TTI lengths corresponding to mini-slots and slots) or various subcarrier spacings (e.g. 15/30/60 kHz) when communicating, while also configured to enable dynamic switching between different TTI lengths or subcarrier spacings. Since the soft buffer memory would need to be shared among different TTI lengths e.g. between LTE sTTI and legacy TTI operations, there is a need to develop an efficient soft buffer management mechanism to allow a base station, such as evolved NodeB (eNodeB) or gNodeB, to dynamically perform DL HARQ operations using different TTI lengths or subcarrier spacings as compared to an initial downlink data transmission.

Some embodiments of a soft buffer management mechanism to enable efficient and low cost soft buffer sharing within the context of a dynamic cross-TTI HARQ operation and soft bits combining include any the following embodiments: (1) HARQ process pairing based full soft buffer sharing between different TTI lengths, that is, between TTIs with different lengths, i.e. a first longer TTI length and a shortened TTI length sTTI or mini-slot; (2) dynamic partial soft-buffer sharing based on signaled soft buffer partition weighting factors for each respective TTI Type or across multiple sets of HARQ processes; and (3) determination of a reference maximum HARQ processes number to enable full flexible cross-TTI-Type HARQ retransmissions and corresponding DCI format design.

An objective of embodiments herein is to achieve efficient soft buffer management where varying TTI Types are used for communication, and hence to offer improved throughput and latency performance between a UE and a base station in the corresponding communication network. Various aspects and features of the disclosure will be described further below, and in particular in an exemplary manner with respect to embodiments (1) to (3) outlined above.

Before addressing particular embodiments of soft buffer sharing to enable cross-TTI Type HARQ processes, example networks and architectures that may be used to implement some demonstrative embodiments will be shown and described with respect to FIGS. 2-7 below.

Figure 2:
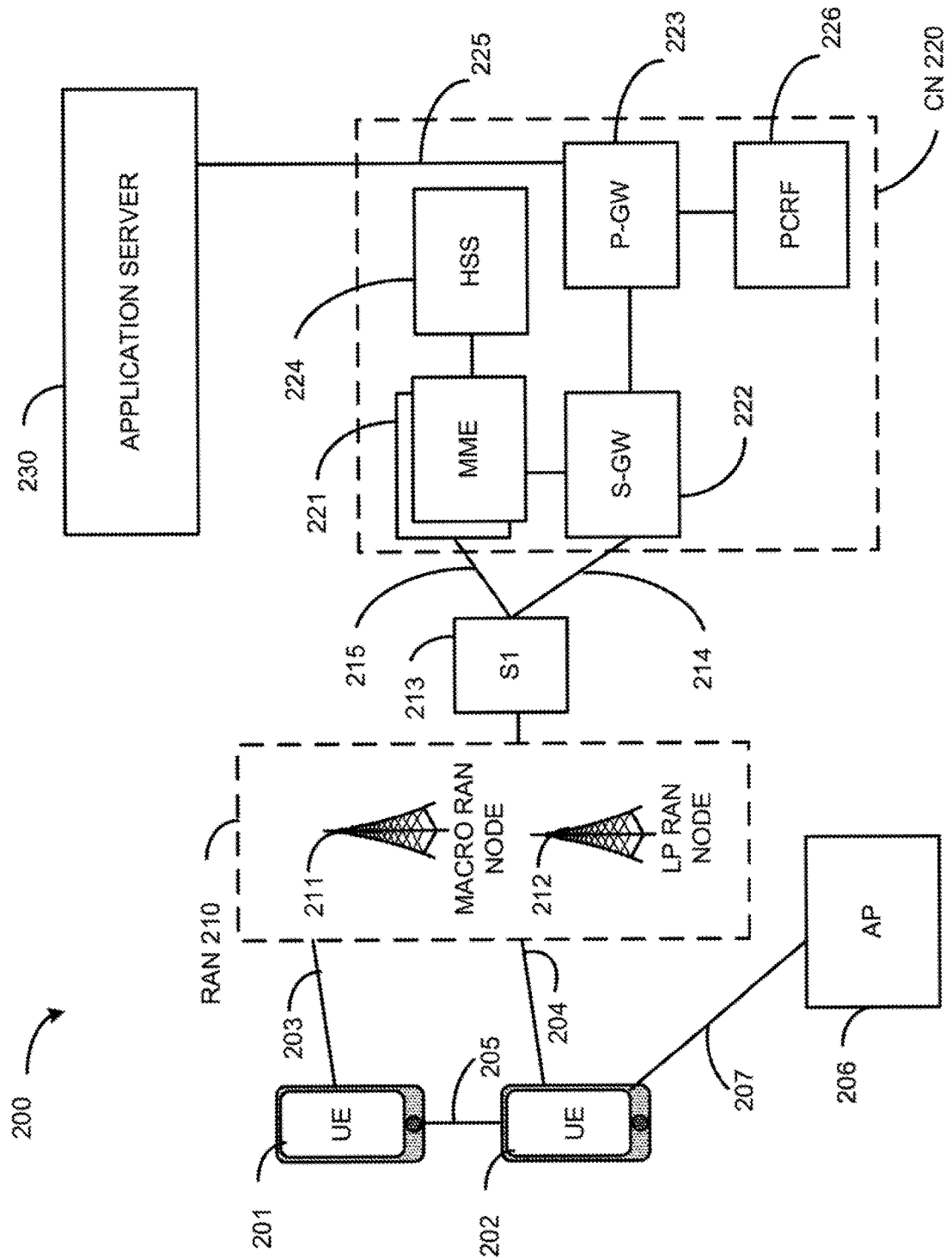
FIG. 2 illustrates an architecture of a system of a network in accordance with some embodiments.

In particular, FIG. 2 illustrates an architecture of a system 200 of a network in accordance with some embodiments. The system 200 is shown to include a user equipment (UE) 201 and a UE 202. The UEs 201 and 202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 201 and 202 may comprise an Internet of Things (IoT) UE, which may comprise a network access layer designed for low-power IoT applications utilizing short-lived UE connections. An IoT UE may utilize technologies such as machine-to-machine (M2M) or machine-Type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210—the RAN 210 may be, for example, an Evolved Universal Mobile Telecommunications System (UMTS) Terrestrial Radio Access Network (E-UTRAN), a Next Gen RAN (NG RAN), or some other Type of RAN. The UEs 201 and 202 utilize connections 203 and 204, respectively, each of which comprises a physical communications interface or layer (discussed in further detail below). In this example, the connections 203 and 204 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 210 is shown to be communicatively coupled to a core network (CN) 220—via an S1 interface 213. In embodiments, the CN 220 may be an evolved packet core (EPC) network, a NextGen Packet Core (NPC) network, or some other type of CN. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and routes data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 223 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and Charging Enforcement Function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230.

The RAN 210 may include one or more access nodes that enable the connections 203 and 204. These access nodes (ANs) may be referred to as base stations (BSs), NodeBs, evolved NodeBs (eNodeBs), next Generation NodeBs (gNodeB), RAN nodes, and so forth, and may comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 may terminate the air interface protocol and may be the first point of contact for the UEs 201 and 202. In some embodiments, any of the RAN nodes 211 and 212 may fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 may be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may comprise a plurality of orthogonal subcarriers.

In some embodiments, a downlink resource grid may be used for downlink transmissions from any of the RAN nodes 211 and 212 to the UEs 201 and 202, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently may be allocated. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information, in the form of control information, about the transport format and resource allocations related to the PDSCH, among other things. It may also inform the UEs 201 and 202 about the transport format, resource allocation, and HARQ (Hybrid Automatic Repeat Request) information related to the uplink shared channel. Typically, downlink scheduling (assigning control and shared channel resource blocks to the UE 202 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the Downlink Control Information signal (DCI) and the channel condition. There may be four or more different PDCCH formats defined in LTE with different numbers of CCEs (e.g., aggregation level, L=1, 2, 4, or 8).

Figure 3:
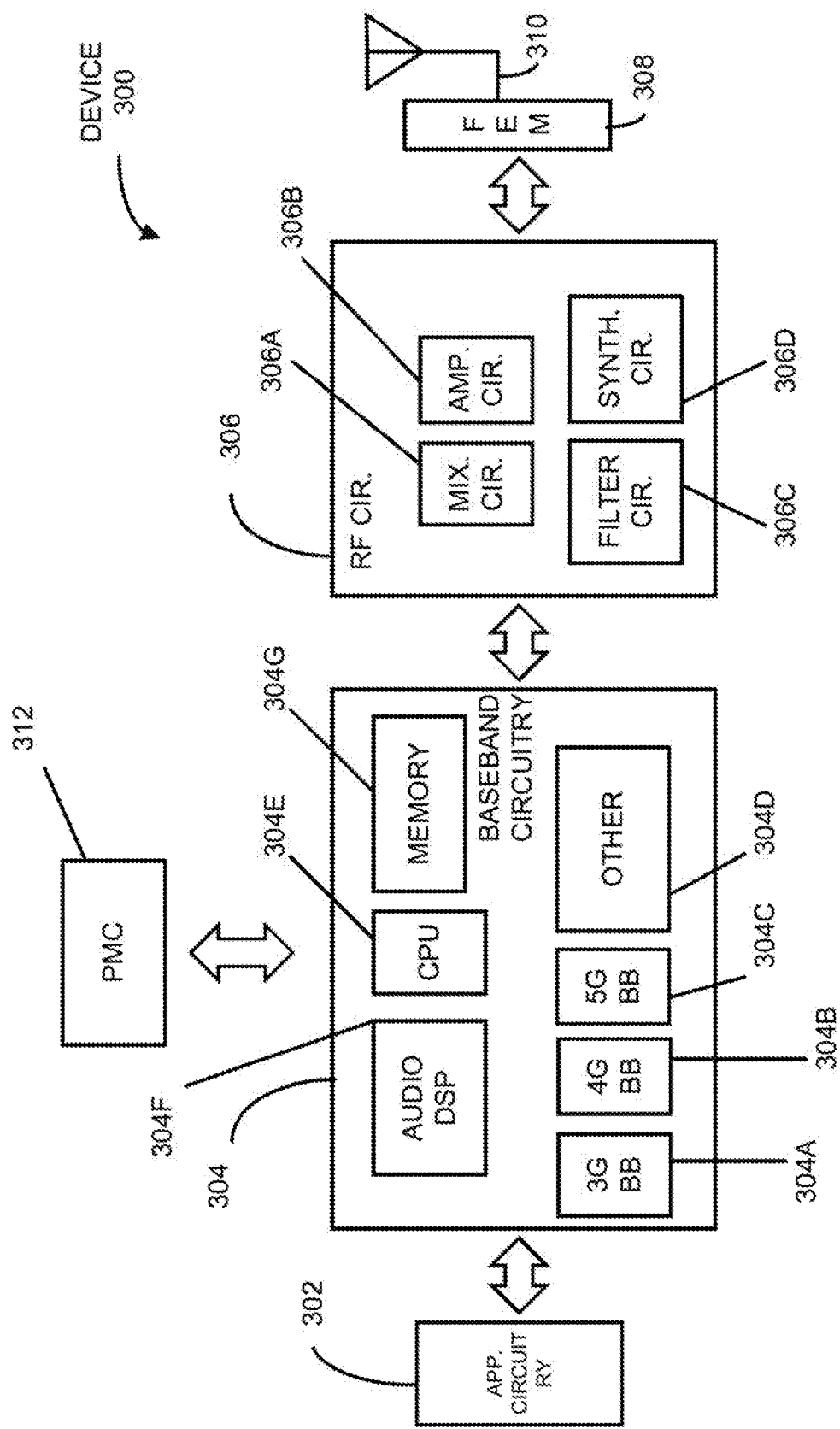
FIG. 3 illustrates example components of a device in accordance with some embodiments.

FIG. 3 illustrates example components of a device 300 in accordance with some embodiments. In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together as shown by way of example. The components of the illustrated device 300 may be included in a UE or a RAN node. In some embodiments, the device 300 may include less elements (e.g., a RAN node may not utilize application circuitry 302, and instead include a processor/controller to process IP data received from an EPC or Evolved Packet Core. In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors, and one or more memories for storing instructions or control logic, the memories coupled to the baseband processors, the baseband processors to implement the control logic to process baseband signals received from a receive signal path of the RF circuitry 306 and to generate baseband signals for a transmit signal path of the RF circuitry 306. Baseband processing circuity 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include a Low Noise Amplifier LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 2 12 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
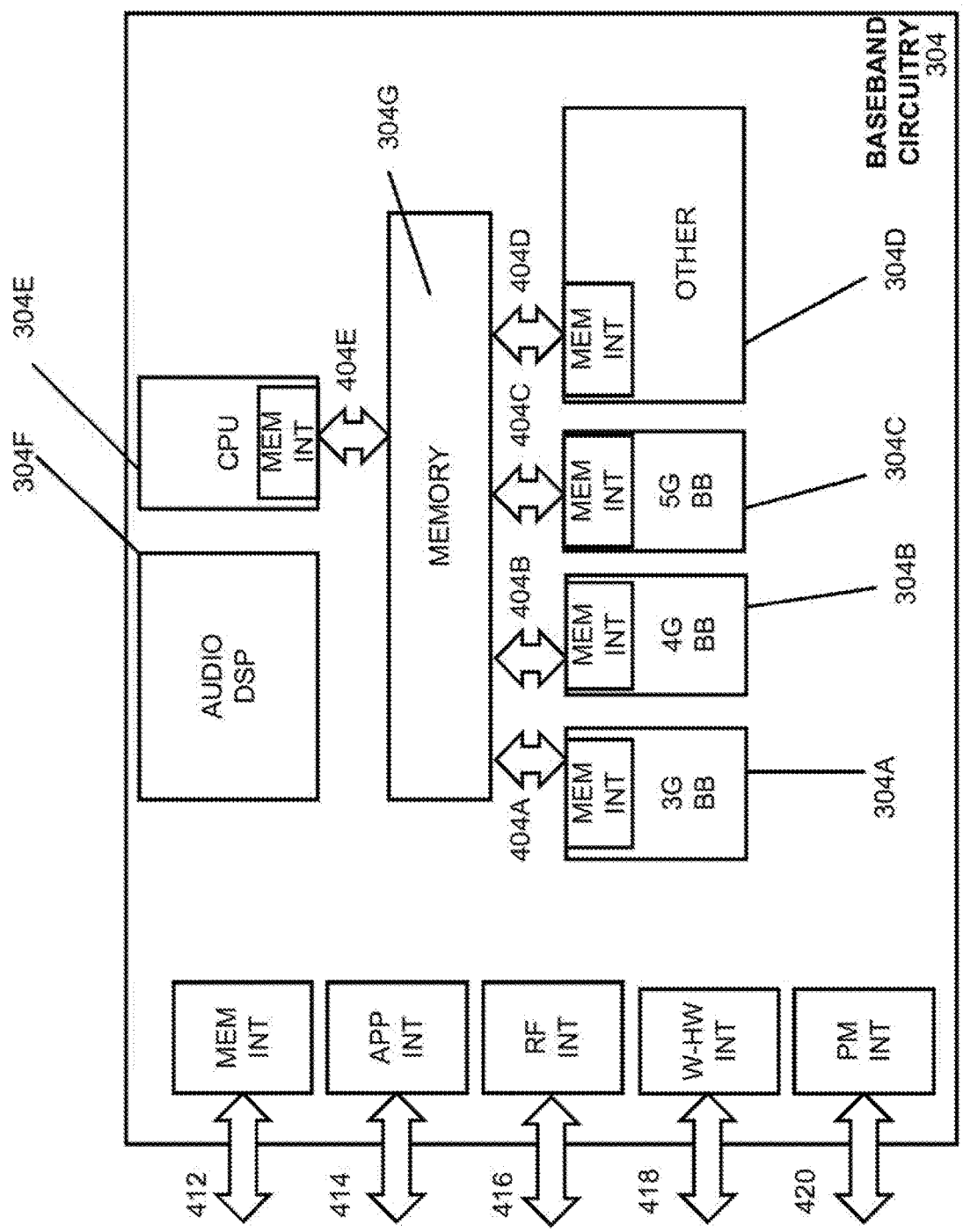
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312).

Figure 5:
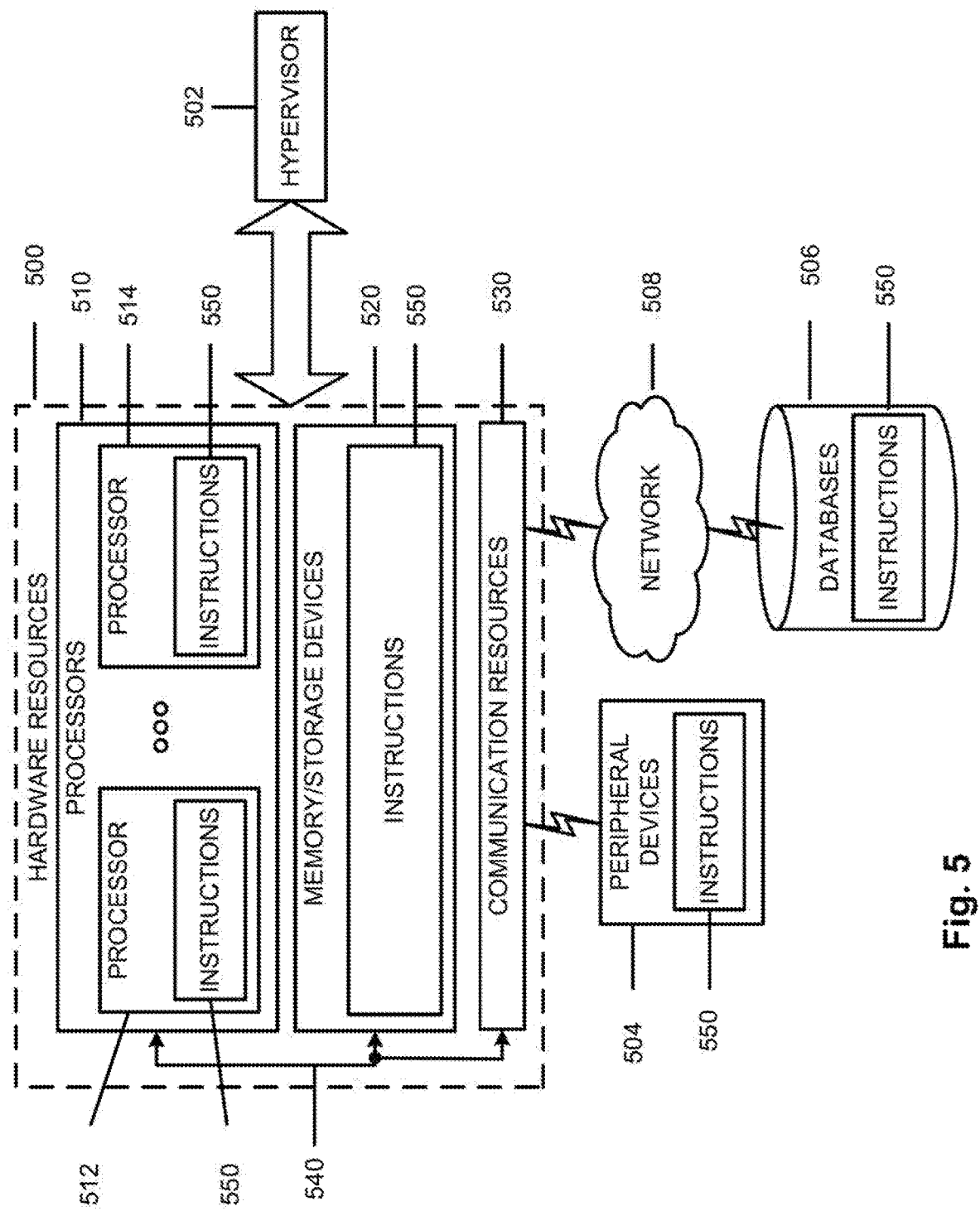
FIG. 5 is a block diagram illustrating components, according to some example embodiments, able to read instructions from a machine-readable or computer-readable medium and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any Type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Figure 6:
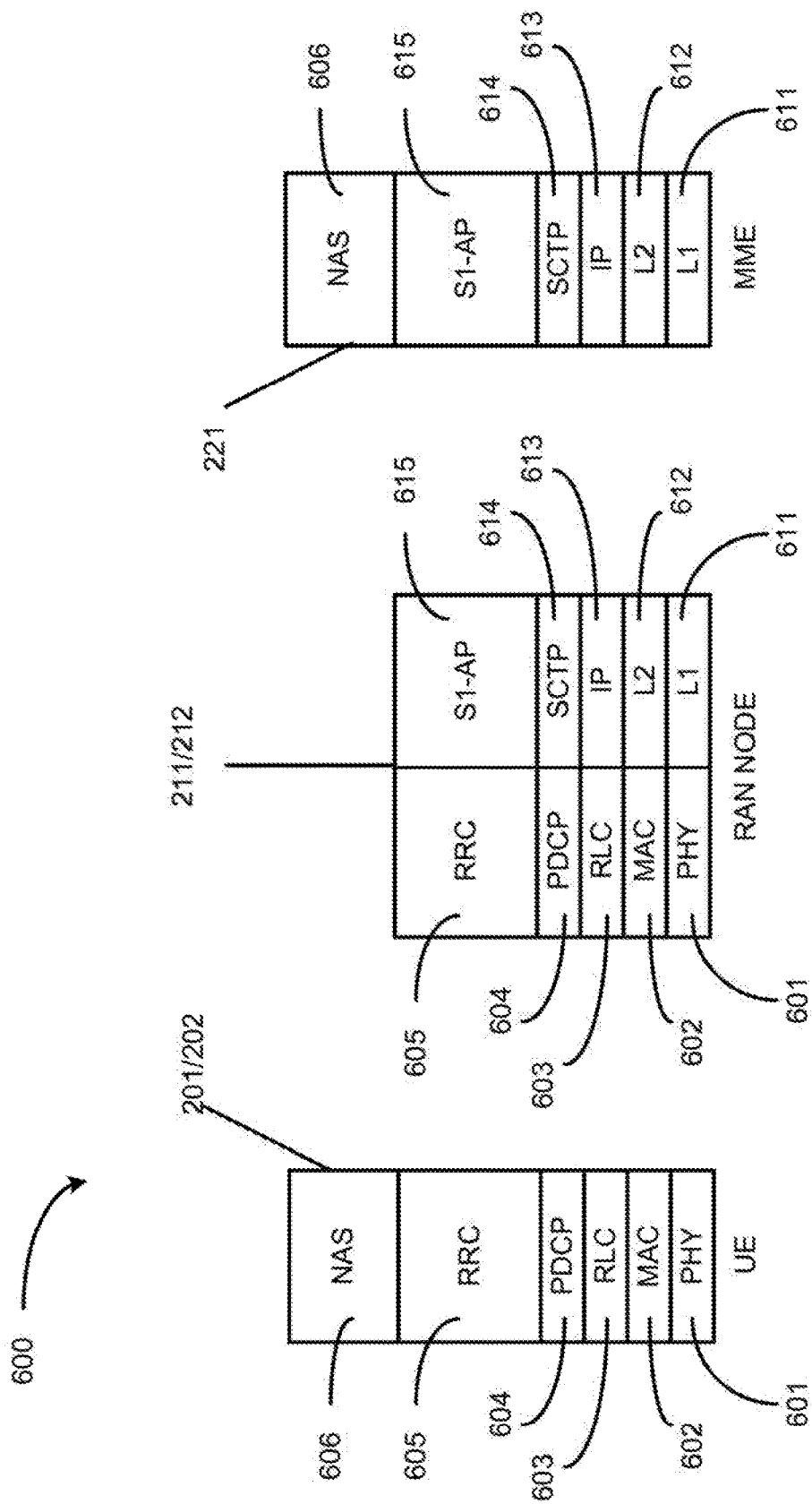
FIG. 6 is an illustration of a control plane protocol stack in accordance with some embodiments.

FIG. 6 is an illustration of a control plane protocol stack in accordance with some embodiments. In this embodiment, a control plane 600 is shown as a communications protocol stack between the UE 201 (or alternatively, the UE 202), the RAN node 211 (or alternatively, the RAN node 212), and the MME 221.

The PHY layer 601 may transmit or receive information used by the MAC layer 602 over one or more air interfaces. The PHY layer 601 may further perform link adaptation or adaptive modulation and coding (AMC), power control, cell search (e.g., for initial synchronization and handover purposes), and other measurements used by higher layers, such as the RRC layer 605. The PHY layer 601 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 602 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 603 may operate in a plurality of modes of operation, including: Transparent Mode (TM), Unacknowledged Mode (UM), and Acknowledged Mode (AM). The RLC layer 603 may execute transfer of upper layer protocol data units (PDUs), error correction through automatic repeat request (ARQ) for AM data transfers, and concatenation, segmentation and reassembly of RLC SDUs for UM and AM data transfers. The RLC layer 603 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 604 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 605 may include broadcast of system information (e.g., included in Master Information Blocks (MIBs) or System Information Blocks (SIBS) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBS may comprise one or more information elements (IEs), which may each comprise individual data fields or data structures.

The UE 201 and the RAN node 211 may utilize a Uu interface (e.g., an LTE-Uu interface) to exchange control plane data via a protocol stack comprising the PHY layer 601, the MAC layer 602, the RLC layer 603, the PDCP layer 604, and the RRC layer 605.

The non-access stratum (NAS) protocols 606 form the highest stratum of the control plane between the UE 201 and the MME 221. The NAS protocols 606 support the mobility of the UE 201 and the session management procedures to establish and maintain IP connectivity between the UE 201 and the P-GW 223.

The S1 Application Protocol (S1-AP) layer 615 may support the functions of the S1 interface and comprise Elementary Procedures (EPs). An EP is a unit of interaction between the RAN node 211 and the CN 220. The S1-AP layer services may comprise two groups: UE-associated services and non UE-associated services. These services perform functions including, but not limited to: E-UTRAN Radio Access Bearer (E-RAB) management, UE capability information/indication, mobility, NAS signaling transport, RAN Information Management (RIM), and configuration transfer.

The Stream Control Transmission Protocol (SCTP) layer (alternatively referred to as the SCTP/IP layer) 614 may ensure reliable delivery of signaling messages between the RAN node 211 and the MME 221 based, in part, on the IP protocol, supported by the IP layer 613. The L2 layer 612 and the L1 layer 611 may refer to communication links (e.g., wired or wireless) used by the RAN node and the MME to exchange information.

The RAN node 211 and the MME 221 may utilize an S1-MME interface to exchange control plane data via a protocol stack comprising the L1 layer 611, the L2 layer 612, the IP layer 613, the SCTP layer 614, and the S1-AP layer 615.

Figure 7:
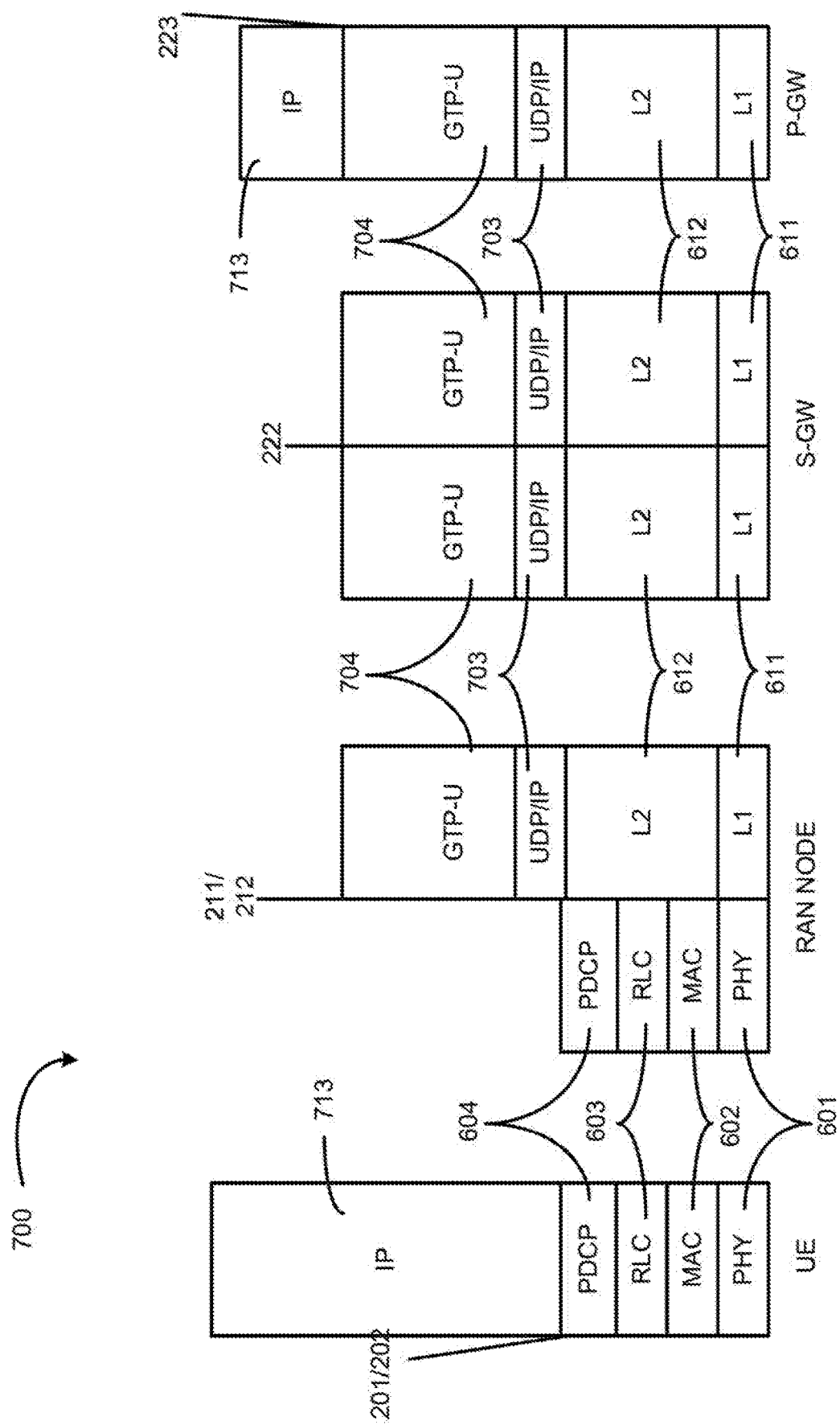
FIG. 7 is an illustration of a user plane protocol stack in accordance with some embodiments.

FIG. 7 is an illustration of a user plane protocol stack in accordance with some embodiments. In this embodiment, a user plane 700 is shown as a communications protocol stack between the UE 201 (or alternatively, the UE 202), the RAN node 211 (or alternatively, the RAN node 212), the S-GW 222, and the P-GW 223. The user plane 700 may utilize at least some of the same protocol layers as the control plane 600. For example, the UE 201 and the RAN node 211 may utilize a Uu interface (e.g., an LTE-Uu interface) to exchange user plane data via a protocol stack comprising the PHY layer 601, the MAC layer 602, the RLC layer 603, the PDCP layer 604 and the IP layer 713.

The General Packet Radio Service (GPRS) Tunneling Protocol for the user plane (GTP-U) layer 704 may be used for carrying user data within the GPRS core network and between the radio access network and the core network. The user data transported can be packets in any of IPv4, IPv6, or PPP formats, for example. The UDP and IP security (UDP/IP) layer 703 may provide checksums for data integrity, port numbers for addressing different functions at the source and destination, and encryption and authentication on the selected data flows. The RAN node 211 and the S-GW 222 may utilize an S1-U interface to exchange user plane data via a protocol stack comprising the L1 layer 611, the L2 layer 612, the UDP/IP layer 703, and the GTP-U layer 704. The S-GW 222 and the P-GW 223 may utilize an S5/S8a interface to exchange user plane data via a protocol stack comprising the L1 layer 611, the L2 layer 612, the UDP/IP layer 703, and the GTP-U layer 704. As discussed above with respect to FIG. 6, NAS protocols support the mobility of the UE 201 and the session management procedures to establish and maintain IP connectivity between the UE 201 and the P-GW 223.

According to some demonstrative embodiments, a device for a UE is to include a soft buffer including a plurality of soft buffer partitions to store a plurality of soft bits for a number of hybrid automatic retransmission request (HARQ) processes, wherein the number of HARQ processes includes first HARQ processes corresponding to a first Time Transmission Interval (TTI) Type of a first duration (TTI Type 1), and second HARQ processes corresponding to a second TTI Type of a second duration (TTI Type 2) shorter than the first duration. The device is further to include processing circuitry to communicate with a base station in a cellular network, the processing circuitry further to effect a dynamic switching between a TTI Type 1 communication mode and a TTI Type 2 communication mode, and to selectively access the soft buffer partitions to perform, based on the switching, at least one of the first HARQ processes corresponding to TTI Type 1 and the second HARQ processes corresponding to TTI Type 2.

According to another embodiment, a device for a base station is to include memory; and processing circuitry coupled to the memory, the processing circuitry to: communicate with a User Equipment (UE) in a cellular network; perform, with the UE, hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; dynamically switch between a TTI Type 1 communication mode and a TTI Type 2 communication mode with the UE; encode a control signal to the UE including information to be used by the UE to configure a soft buffer thereof, the soft buffer including a plurality of soft buffer partitions to store a plurality of soft bits for the HARQ processes, wherein the HARQ processes include the first HARQ processes and the second HARQ processes; and cause transmission of the control signal to the UE.

In the instant description, when "at least one of" a given set or list of items connected with "and" is mentioned herein, what is meant is a reference to either one of the noted items or any combination of the items. For example, as used herein, "at least one of A, B, and C" means A, or B, or C, or A and B, or A and C, or B and C, or A and B and C. In addition, when referring to various "TTI Types" in the context of soft buffer management and HARQ ACK processes, mention may be made of a TTI Type 1 and of a TTI Type 2, where the specific embodiment of TTI Type 1 referred to here is a 1 ms TTI duration, and a specific embodiment of a TTI Type 2 referred to here is a 2-symbol TTI duration. However, when referring to TTI Types 1 and 2, embodiments are not limited to the specific embodiments of TTI Types (1 ms and 2-symbol) mentioned here, and may include two TTI durations that are merely different from one another.

According to a first aspect, the objective is achieved by a method to enlarge the soft buffer size to accommodate the additional sTTI transmissions for a UE that is capable of communicating using e.g. sTTI or mini-slot. Respective soft buffer management mechanisms may be selected for different TTI Types. In some embodiments, if a UE is configured to communicate using sTTI that has a length of 2 symbols, a soft buffer size may for example be increased ¼ times to account for the additional sTTI transmissions, also taking into account the smaller TBs of sTTI.

HARQ Process Pairing Based Full Soft Buffer Sharing Between Different TTI Lengths, that is, Between a First Longer TTI Length and a Shortened TTI Length sTTI or Mini-Slot:

According to a first embodiment, the soft buffer to store corrupted code words for a cross-TTI Type HARQ retransmission may have an increased size to include additional soft buffer partitions for each of the HARQ processes contemplated for the sTTI HARQ retransmission. This embodiment provides a partition for all available HARQ processes across available TTI Types.

Figure 8:
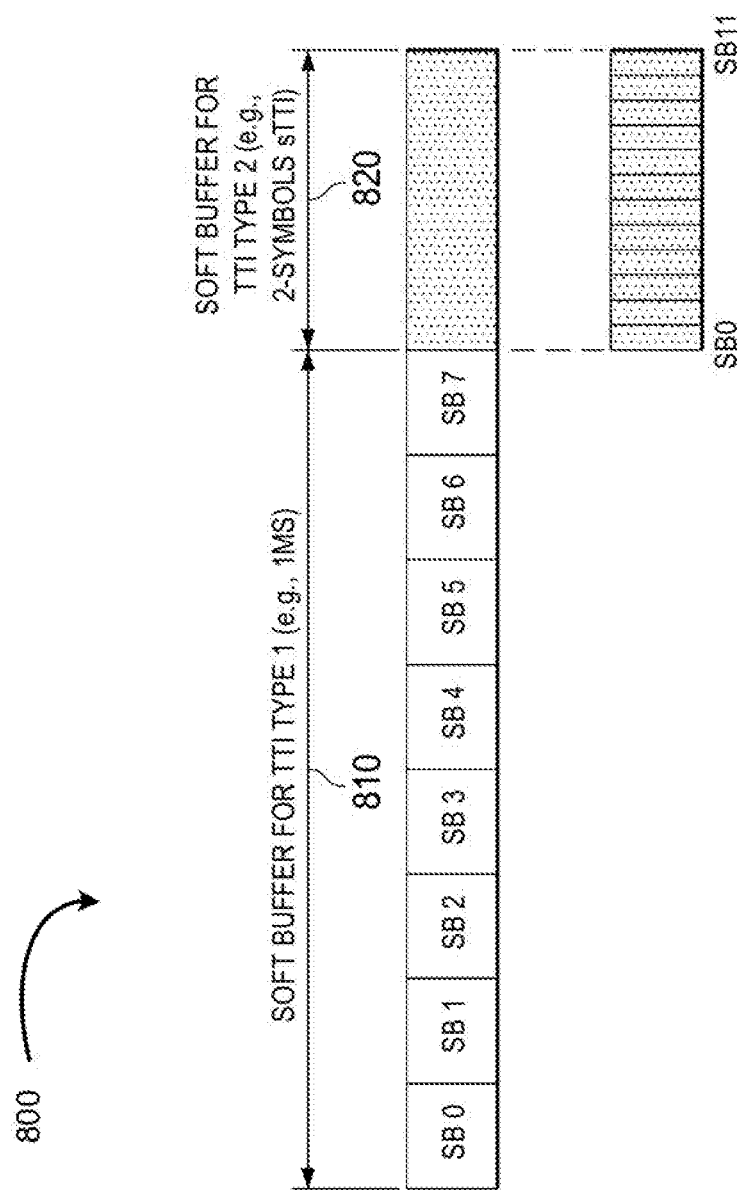
FIG. 8 shows a first embodiment of a soft buffer 800 for two different TTI Types, namely a 1 ms TTI or TTI Type 1, and a 2-symbol TTI or sTTI, or TTI Type 2.

Let us now refer to FIG. 8, which shows a first embodiment of a soft buffer 800 for two different TTI Types, namely a 1 ms TTI or TTI Type 1, and a 2-symbol TTI or sTTI, or TTI Type 2. According to one embodiment, as shown in FIG. 8, non-overlapped soft buffers 810 and 820 may be used to store the soft values of the received codewords corresponding to different TTI lengths, respectively. In some embodiments, the size of soft buffer portion 820 for HARQ operation of LTE DL sTTI or NR mini-slot may be indicated through the UE capability information signaling. In one example, the size of soft buffer portion 820 may be a predefined/fixed value, which may be a scaled size multiplexed by the size of soft buffer portion 810 to generate a scaled soft buffer portion 820. The size of soft buffer portion 810 may be indicated and associated with a UE category. In this approach, the predefined value may be fixed in accordance with a specification or based on the ratio of respective length of different TTI Types i.e. TTI Type 1 and Type 2, and is therefore not configuration or dynamically adjustable.

In FIG. 8, the soft buffer portion 810 for TTI Type 1 includes 8 soft buffer slots SB 0 to SB 7 corresponding to the respective 8 HARQ processes that are available for the legacy n+4 HARQ timeline for TTI Type 1. As noted previously, each UE divides the available soft buffer equally into the configured number of HARQ processes. Each of the divided soft buffer partitions may be used to store soft values of the received corrupted bits of the codeword received in a prior downlink transmission. In addition, the soft buffer portion 820 is shown as including 12 soft buffer partitions SB 0 to SB 11, with the size of each of the soft buffer partitions in soft buffer portion 820 being a fraction of the size of each of the soft buffer partitions in soft buffer portion 810. The embodiment of FIG. 8 provides maximum flexibility for switching between TTI and sTTI type communications, as the eNodeB/gNodeB can freely schedule both TTI and sTTI type communications.

Referring to the first embodiment, as described by way of example in FIG. 8, it may be unnecessary to reserve additional dedicated soft buffer resources for different TTI lengths, e.g. sTTI and normal TTI, since scenarios may be rare where all of HARQ processes of different TTI Types will need to utilize their soft buffer resources for retransmission. One goal for providing an efficient design for soft buffer management in a cross-TTI system may be to minimize an increase in soft buffer memory size to accommodate the sTTI Type communications. Accordingly, and as described herein, a second embodiment of a soft buffer management solution is disclosed.

According to a second embodiment of the present disclosure, a HARQ processes pair may be formed, for example in accordance with a LTE or NR specification, where the HARQ processes pair may allow a single soft buffer (SB) slot to be shared between a HARQ process indices within a group using different TTI Types. In essence, according to this second embodiment, a single soft buffer partition may be shared between differing TTI Type HARQ processes, such that the single soft buffer is shared between a first HARQ process index of TTI Type 1, and a second HARQ process index of TTI Type 2. In this way, it would not be necessary to increase the soft buffer size as was suggested in the first embodiment, an example of which is provided in FIG. 8. The second embodiment allows a smart sharing of soft buffer size based on predetermined pairings of HARQ process indices within a given soft buffer partition as between a TTI Type 1 and a TTI Type 2. In this manner, when switching between TTI Type 1 and TTI Type 2, corrupted codewords already stored in a given soft buffer partition under a first HARQ process index corresponding to a first TTI Type may be shared (for use in the HARQ incremental redundancy process) in that same given soft buffer with a second HARQ process index corresponding to a second TTI Type. Those corrupted codewords may therefore be used for soft combining as between the first HARQ process with TTI Type 1 and the second HARQ process with TTI Type 2.

According to some embodiments, the paired HARQ process indices may be dependent on the maximum number of DL HARQ process indices of each TTI Type, denoted here by $M_{DL\_HARQ}^{TTI\ type}$.

Figure 9:
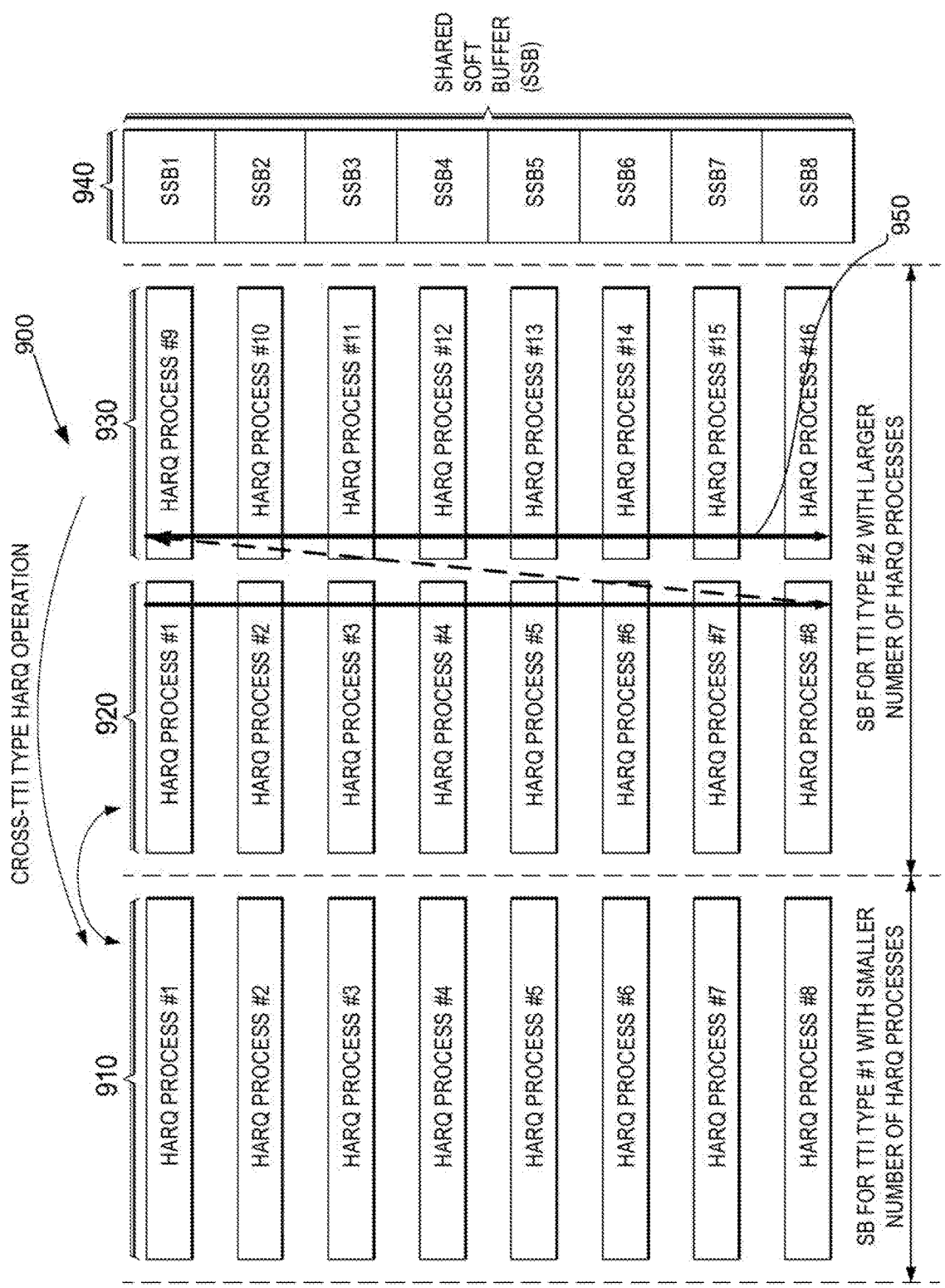
FIG. 9 depicts a first embodiment of a shared soft buffer SSB including SSB partitions for both TTI Type 1 HARQ processes and TTI Type 2 HARQ processes.

As shown by way of example in a first embodiment of FIG. 9, which depicts a shared soft buffer SSB 900 including SSB partitions for both TTI Type 1 HARQ processes 910 and TTI Type 2 HARQ processes 920 and 930, if:

$$M_{DL\_HARQ}^{TTI\ type\ 1}=8 \text{ and } M_{DL\_HARQ}^{TTI\ type\ 2}=16$$

then the HARQ process index X of TTI Type 1 may be paired with a set of HARQ process indices <Y1, . . . Yi> of TTI Type 2 in a given shared soft buffer partition SSB as given by Equation 1 below:

$$Y_i=(i-1)\times M_{DL\_HARQ}^{TTI\ type\ 1}+X \quad \text{Eq. (1)}$$

where i=1, . . . , $[M_{DL\_HARQ}^{TTI\ type\ 2}/M_{DL\_HARQ}^{TTI\ type\ 1}]$ and $M_{DL\_HARQ}^{TTI\ type\ 2} > M_{DL\_HARQ}^{TTI\ type\ 1}$.

Using Equation 1, i=1, 2, we can see that HARQ process index X of TTI Type 1 will each be paired with two HARQ process indices of TTI Type 2, one for each integer value of i. The actual pairings using Equation 1 above are shown in FIG. 9.

As seen in FIG. 9, a soft buffer 900 is shown as including a number of shared soft buffers 940 includes shared soft buffer partitions SSB including SSB1 to SSB8. Each SSB may be shared between one HARQ process index of TTI Type 1 910, and two HARQ process indices 920 and 930 of TTI Type 2 as shown. For example, using Equation 1, the resulting HARQ process indices set of TTI Type 2 that shares a shared soft buffer partition SSB with HARQ process index #1 of TTI Type 1 910 will include HARQ process index #1 920 and HARQ process #9 930. The specific HARQ process index pairings from TTI Type 1 910, including HARQ process indices #1 through #8 are shown as being paired, respectively, with TTI Type 2 920 and 930 HARQ process index pairs #1 and #9, #2 and #10, #3 and #11, #4 and #12, #5 and #13, #6 and #14, #7 and #15 and #8 and #16. These pairings of HARQ process indices denote among other things the SSBs that respective HARQ processes associated with respective indices will access in order to preform HARQ using incremental redundancy. Since, according to this embodiment, there will be more HARQ process indices of TTI Type 2 in each SSB partition than a HARQ process index of TTI Type 1 in that SSB, some embodiments contemplate predefining, for each SSB partition, a default HARQ process index of TTI Type 2 when switching from a TTI Type 1 to a TTI Type 2 DL communication.

Referring still to FIG. 9, by way of example, when the base station decides to effect a dynamic switching its DL communication from a TTI Type 1 to TTI Type 2, the lowest HARQ process index of TTI Type 2 i.e. HARQ process index #1 920 of TTI Type 2, may be predefined as a default or go-to HARQ process for retransmission of HARQ process index #1 using TTI Type 1 if a switch was made to TTI Type 2. Suppose for example that the base station sends a first DL transmission in a PDSCH using TTI Type 1 to a UE that includes a SSB similar to SSB 940. Corrupted codewords in that first DL transmission may be stored in SSB1, and the UE may then send a first HARQ NACK message to the base station using HARQ process #1 of TTI Type 1 as allocated in SSB1. Suppose that, thereafter, the base station switches to a TTI Type 2 regime and, based on the first HARQ NACK sent using HARQ process #1 of TTI Type 1, sends a second DL transmission in a PDSCH, or a DL retransmission including redundancy codewords corresponding to the first DL transmission to the UE, now using a TTI Type 2 transmission mode. At this point, any corrupted codewords in the retransmission would be stored in SSB1, and the UE may then send a second HARQ feedback, such as another HARQ NACK message to the base station, this time using HARQ process #1 of TTI Type 2 as allocated in SSB 1 (the default predefined go-to HARQ process in SSB1 when the base station has switched from TTI Type 1 to TTI Type 2). The HARQ process #1 of TTI Type 2 may also be used by the UE for the retransmission to perform soft combining of the first DL transmission stored codewords and of the DL retransmission redundancy codewords to arrive at a determination regarding whether the HARQ feedback under HARQ process #1 of TTI Type 2 ought to be a NACK or an ACK. The retransmission process may continue until the content of the first DL transmission is received without errors, at which time a HARQ ACK message may be sent by the UE to the base station.

Referring still to FIG. 9, while the base station is using TTI Type 2 to transmit, there could be as many as 8 retransmissions from the 16 available HARQ processes under TTI Type 2 after that first DL transmission that came previously under TTI Type 1 before the switch to TTI Type 2, each retransmission allowing the use of a selected one of the HARQ process #1 through #16 in 920 and 930 in an incremental manner as indicated by arrow 950 in FIG. 9. In addition, while the base station is using TTI Type 1 to transmit, there could be as many as 7 retransmissions after that first DL transmission under TTI Type 1, each retransmission allowing the use of a respective one of the HARQ process #1 through #8 in 910.

Figure 10:
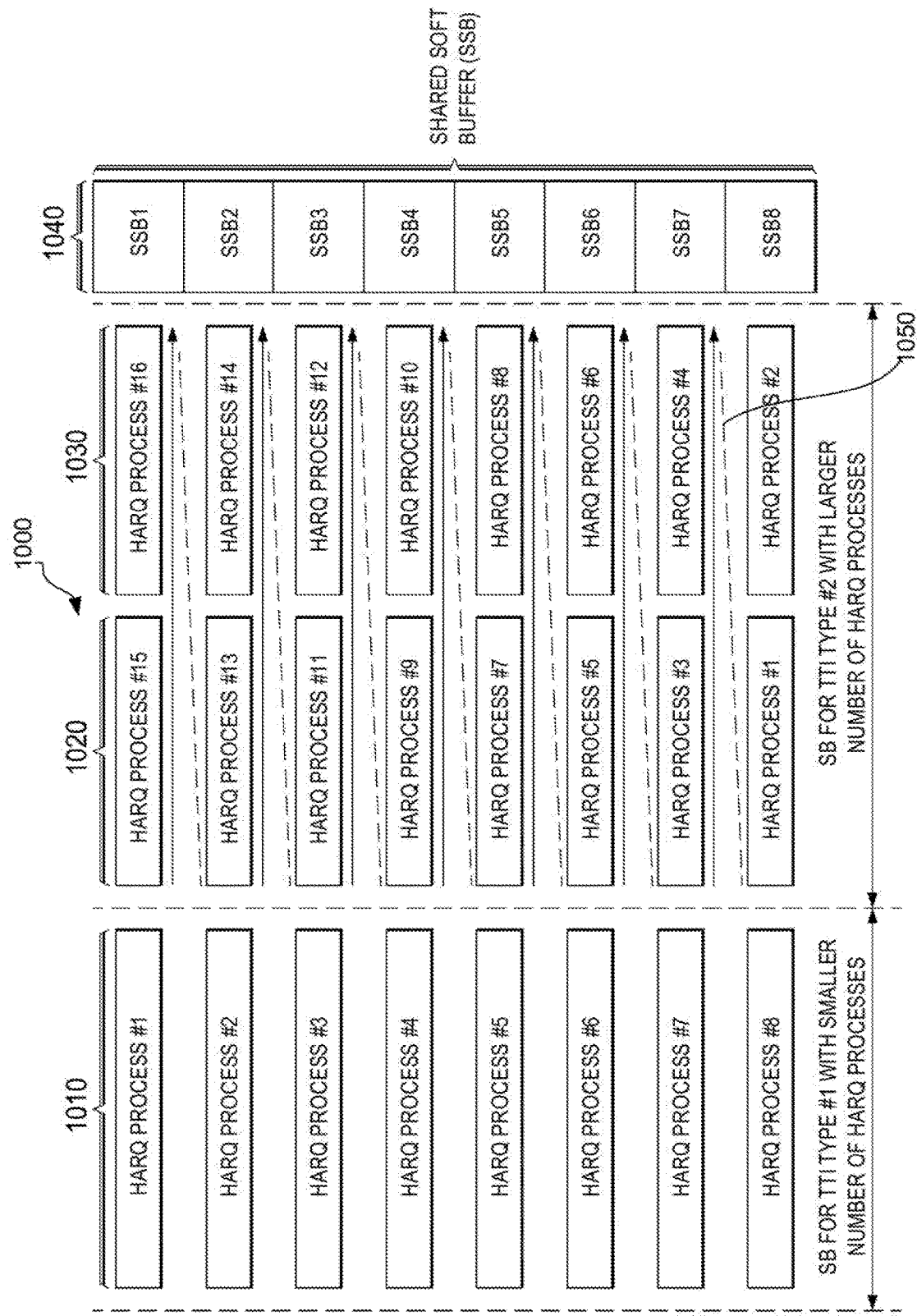
FIG. 10 depicts a second embodiment of shared soft buffer SSB including SSB partitions for both TTI Type 1 HARQ processes and TTI Type 2 HARQ processes.

As shown by way of example in a second embodiment of FIG. 10, a shared soft buffer SSB 1000 includes SSB partitions for both TTI Type 1 HARQ processes 1010 and TTI Type 2 HARQ processes 1020 and 1030. The SSB embodiment of FIG. 10 provides an alternative mechanism to that shown in FIG. 9, and aims to provide flexibility for soft buffer allocation and sharing through HARQ processes pairing between different TTI Types. Unlike the previous embodiment of FIG. 9, in FIG. 10, the HARQ process index X of TTI Type 1 may be paired with a set of HARQ processes <Y1, . . . Yi> of TTI Type 2 according to Equation 2 provided below:

$$Y_i = (M_{DL\_HARQ}^{TTI\ type\ 1} - X + 1) \times [M_{DL\_HARQ}^{TTI\ type\ 2}/M_{DL\_HARQ}^{TTI\ type\ 1}] + i \qquad \text{Eq. (2)}$$

where i=0, 1, . . . , $[M_{DL\_HARQ}^{TTI\ type\ 2}/M_{DL\_HARQ}^{TTI\ type\ 1}]-1$.

Referring still to FIG. 10, by way of example, when the base station decides to effect a dynamic switching its DL communication from a TTI Type 1 to TTI Type 2, the lowest HARQ process index of TTI Type 2 i.e. HARQ process index #15 1020 of TTI Type 2, may be predefined as a default or go-to HARQ process for retransmission of HARQ process index #1 using TTI Type 1 if a switch was made to TTI Type 2. Suppose for example that the base station sends a first DL transmission in a PDSCH using TTI Type 1 to a UE that includes a SSB similar to SSB 940. Corrupted codewords in that first DL transmission may be stored in SSB1, and the UE may then send a first HARQ NACK message to the base station using HARQ process #1 of TTI Type 1 as allocated in SSB1. Suppose that, thereafter, the base station switches to a TTI Type 2 regime and, based on the first HARQ NACK sent using HARQ process #1 of TTI Type 1, sends a second DL transmission in a PDSCH, or a DL retransmission including redundancy codewords corresponding to the first DL transmission to the UE, now using a TTI Type 2 transmission mode. At this point, any corrupted codewords in the retransmission would be stored in SSB1, and the UE may then send a second HARQ feedback, such as another HARQ NACK message to the base station, this time using HARQ process #16 of TTI Type 2 as allocated in SSB 1 (the default predefined go-to HARQ process in SSB1 when the base station has switched from TTI Type 1 to TTI Type 2). The HARQ process #16 of TTI Type 2 may also be used by the UE for the retransmission to perform soft combining of the first DL transmission stored codewords and of the DL retransmission redundancy codewords to arrive at a determination regarding whether the HARQ feedback under HARQ process #16 of TTI Type 2 ought to be a NACK or an ACK. The retransmission process may continue until the content of the first DL transmission is received without errors, at which time a HARQ ACK message may be sent by the UE to the base station.

Referring still to FIG. 10, while the base station is using TTI Type 2 to transmit, there could be as many as 8 retransmissions from 16 available HARQ processes under TTI Type 2 after that first DL transmission under TTI Type 1 before the switch to TTI Type 2, each retransmission allowing the use of a selected one of the HARQ processes #15, #16, #13, #14, #11, #12, #9, #10, #7, #8, #5, #6, #3, #4, #1 and #2 in 1020 and 1030 in an incremental manner as indicated by arrow 1050 in FIG. 9. In addition, while the base station is using TTI Type 1 to transmit, there could be as many as 7 retransmissions after that first DL transmission under TTI Type 1, each retransmission allowing the use of a respective one of the HARQ process #1 through #8 in 1010. An advantage of the embodiment of FIG. 10 over that in FIG. 9 is that the SSB scheme in FIG. 10 allows HARQ processes as between TTI Type 1 and TTI Type 2 to be continuously scheduled as the allocations as between the TTI Type 1 and TTI Type 2 HARQ process indices are non-overlapping. For example, the embodiment of FIG. 10 allows the non-overlapping soft buffer partitions corresponding to TTI Type 2 HARQ processes #1-#6 to be used while the soft buffer partitions corresponding to TTI Type 1 HARQ processes #1 to #5 are being used. The above is possible as the NACK rate is typically less than 10%, and given the time delay n+x representing a time delay between each DL transmission of data and each corresponding HARQ ACK/NACK transmission.

For the embodiments of FIGS. 9 and 10, if the base station decides to effect a dynamic switching from a TTI Type 2 mode to TTI Type 1 mode for DL data retransmission, and, in the event that only one of paired HARQ processes in a given SSB is failed before the TTI Type switch to TTI Type 1, the failed HARQ process, for example in the given embodiment of FIG. 9 where we are in SSB1, either HARQ process #1 920 or HARQ process #9 930, may be scheduled on TTI Type 1 using the paired HARQ process #1 910 for retransmission. However, using TTI Type 1 910 for the HARQ retransmission of TTI Type 2 becomes impossible if more than one of the paired HARQ processes of TTI Type 2 have failed before the switch. The reason is that the UE would not know which of these paired HARQ processes of Type 2 i.e. 920 and 930 are to be selectively transmitted by base station for soft combining. The same issue may happen in the context of FIG. 10.

To address the above issue, according to an embodiment, an N-bit information field (IE) may be conditionally added to the DCI formats of TTI Type 1 (in the retransmission) to indicate, to the UE, the selected HARQ processes of TTI Type 2 for cross-TTI-Type HARQ retransmission. Here, the number of bits of the IE may be provided by Equation 3 below:

$$N = \lceil \log_2(i) \rceil \qquad \text{Equation (3)}$$

Where i denotes the number of paired HARQ processes of TTI Type 2 with a given HARQ process of TTI Type 1 in a single SSB partition of a SSB similar to SSB 900 of FIG. 9 or SB 1000 of FIG. 10. For example, in FIG. 9 and FIG. 10, $N = \lceil \log_2(i) \rceil = 1$ since i=2. According to one embodiment, if the received value of this said N-bit IE is "0", referring still by way of example to FIG. 9, the UE is to assume that the soft bits of HARQ process #1 in TTI Type 1 in SSB 1 is associated with HARQ process #1 of TTI Type 2. If the received value of this said N-bit IE is "1", referring still by way of example to FIG. 9, the UE is to assume the soft bits in HARQ process #1 of TTI Type 1 in SSB 1 is associated with HARQ process #9 of TTI Type 2. According to another embodiment, the values of the N-bit IE may be switched, where "1" is to indicate to the UE that it is to assume, in the example of FIG. 9, that HARQ process #1 in TTI Type 1 in SSB 1 is associated with HARQ process #9 of TTI Type 2, and a N-bit IE of "0" is to indicate to the UE that it should assume that the soft bits in HARQ process #1 of TTI Type 1 in SSB 1 are associated with HARQ process #1 of TTI Type 2. According to another embodiment, the number of bits (bitwidth) in the DCI may have a value that is different from one provided by way of Equation 2 above.

In the embodiments of FIGS. 9 and 10, all SSB partitions can be shared between TTI Types 1 and 2 equally.

(2) Dynamic Partial Soft Buffer Sharing Based on Signaled Soft Buffer Partition Weighing Factors for Each Respective TTI Type or Across Multiple Sets of HARQ Processes:

In accordance with some other embodiments, an alternative soft buffer mechanism is provided for cross-TTI Type HARQ processes. These embodiments contemplate using a partially shared soft buffer among the HARQ processes of different TTI Types.

Figure 11:
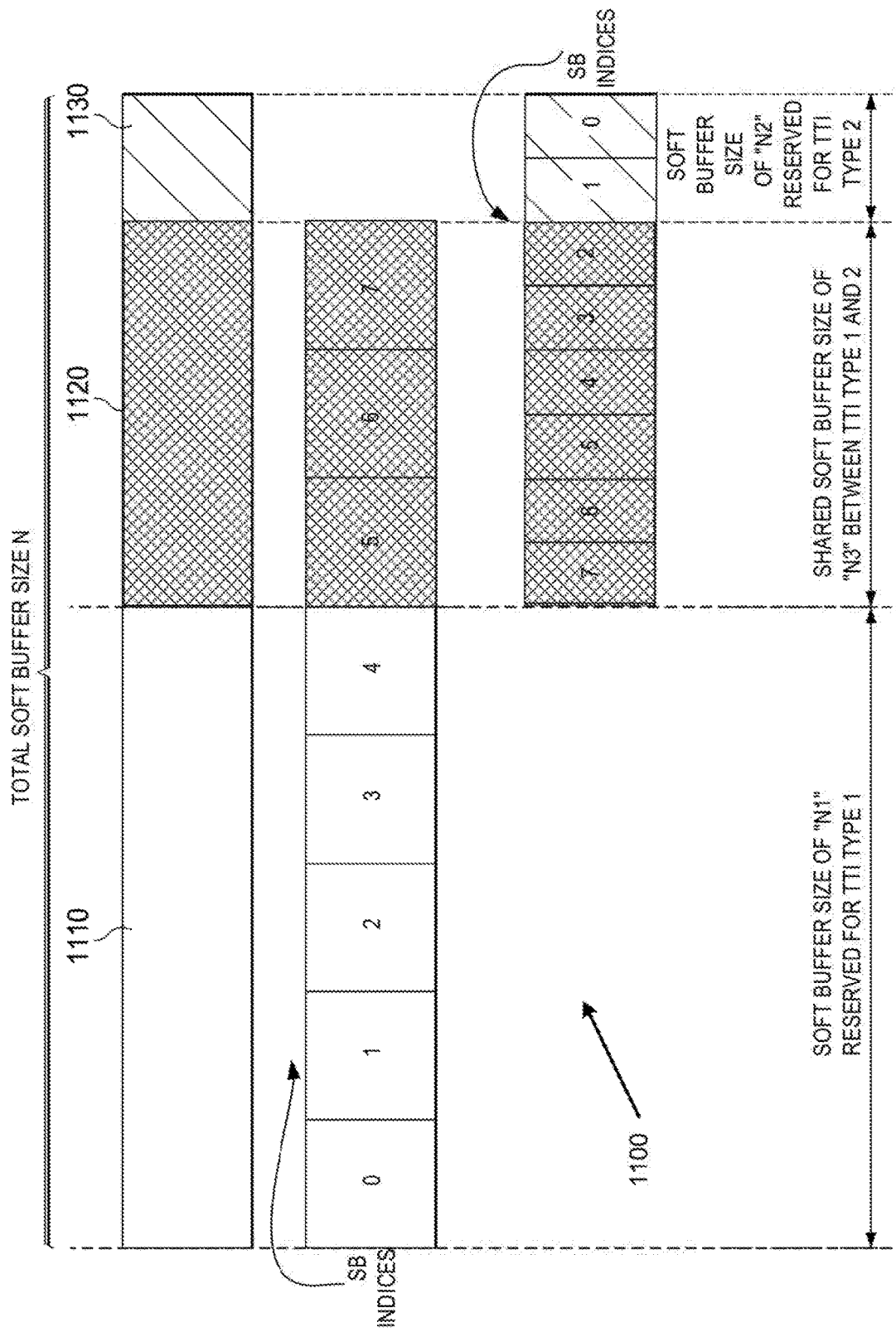
FIG. 11 shows an alternative embodiment of a soft buffer for both TTI Type 1 HARQ processes and TTI Type 2 HARQ processes.

Reference in this regard is made to FIG. 11. According to one embodiment as shown by way of example in FIG. 11, the total soft buffer size N for a soft buffer 1100 at the UE may be divided into three parts, N1 1110, N2 1120 and N3 1130 and where N=N1+N2+N3. The size of N1, N2 and N3 may be configured by higher layers, for example as a function of a ratio of the total soft buffer size N. According to one example, two soft buffer partition weighting factor parameters r1 and r2 may be signaled per UE by higher layers for two TTI Types, respectively, with r1 corresponding to a ratio or weighing factor corresponding to TTI Type 1, and r2 corresponding to a ratio or weighing factor corresponding to TTI Type 2. Each of the weighing factors r1 and r2 represents the fraction of the total soft buffer size N that is to be dedicated to each of TTI Type 1 and TTI Type 2 HARQ processes, respectively. There will be a remainder portion N3 of the total soft buffer size N that may be shared between dedicated soft buffers N1 and N2. The values of parameters r1 and r2 may be determined by base station or pre-defined in a specification based on the TTI length in terms of OFDM symbols for each respective TTI Type. Correspondingly, the UE may determine the soft buffer partitions. The soft buffer partitions may be determined by way of example according to Equations (4a) to (4c) below:

$$N1 = N \times r1 \qquad \text{Eq. (4a)}$$

$$N2 = N \times r2 \qquad \text{Eq. (4b)}$$

$$N3 = N - N1 - N2 \qquad \text{Eq. (4c)}$$

where $0 \le r1 < 1$, $0 \le r2 < 1$ and $r1+r2 \le 1$.

Referring still to FIG. 11, the size of the partitions of the total soft buffer may depend on the number of partitions and may be predefined, configured semi-statically and signaled through higher layers. The soft buffer portion 1110 with size N1 may be reserved and guaranteed for the TTI Type 1 HARQ retransmission. The soft buffer 1130 with size N2 may be reserved and guaranteed for the TTI Type 2 HARQ retransmission. The soft buffer portion 1120 with size N3 may be dynamically share between TTI Type 1 and Type 2 for HARQ operation. In some cases, the size of partitions may be varied. The total soft buffer for each TTI Type may then given by the soft buffer partition weighting factor r1 and r2 per Equations (4a) and (4b) for the specific TTI Type.

According to some embodiments, the base station may partition the soft buffer as between TTI Types and may determine the HARQ processes scheduling for each TTI Type based on a HARQ termination status for each TTI Type within the shared SSB 1120. To improve the utilization of the soft buffer, the HARQ processes pairing relationship may further be predefined in the LTE or NR specification to facilitate the base station scheduling of different TTI Types. As suggested above, some embodiments allow base station to set r2, the weighing factor for the TTI Type 2 soft buffer size, to 0. In such cases, there would no dedicated and guaranteed soft buffer partitioning reserved for TTI Type-2, and a higher priority would be given to HARQ processes of TTI Type 1.

Some embodiments propose calculating the number of soft buffer bits for HARQ operation by using a reference HARQ process number taking into account the total or maximum number HARQ processes of different TTI Types. In the proposed method, the HARQ process number of TTI Type 1 may for example be varied as a function of the presence of other TTI Types, such as, for example Type 2 in calculating the number of soft buffer bits to enable cross-TTI-Type HARQ retransmission.

Figure 12:
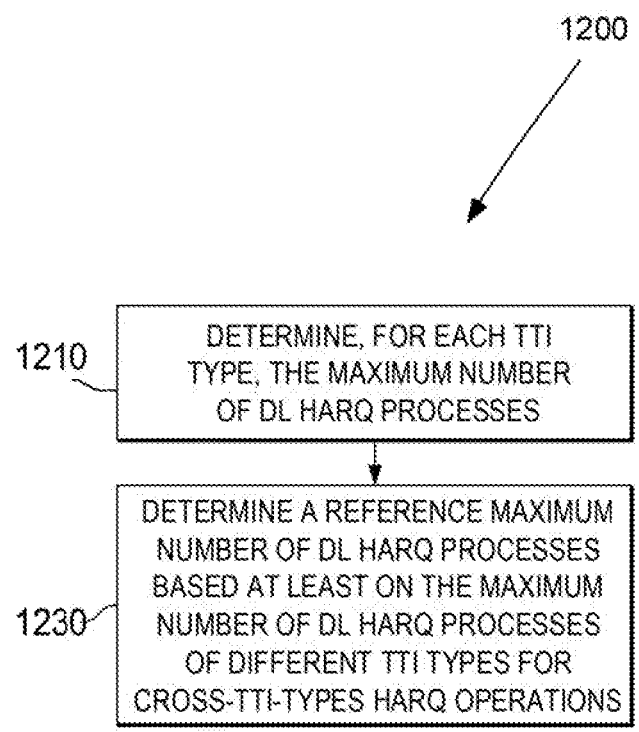
FIG. 12 illustrates a functional block diagram depicting an embodiment that may be implemented by a UE or base station for reference maximum HARQ process number determination and soft buffer management in order to enable cross-TTI-Types HARQ operation.

Reference in this respect is now made to FIG. 12, which illustrates a functional block diagram 1200 depicting an embodiment that may be implemented by a UE or base station for reference maximum HARQ process number determination and soft buffer management in order to enable cross-TTI-Types HARQ operation. The operation may start at 1210, which includes determining, for each TTI Type, the maximum number of DL HARQ processes. At 1230, the operation may further include determining at least one reference maximum number of DL HARQ processes based on at least the determined maximum number of DL HARQ processes of all TTI Types. For certain aspects, the largest value of these determined maximum number of DL HARQ processes of TTI Types may be used as the reference maximum number of DL HARQ processes, and may further be used to determine the bits number of "HARQ process number" field in DCI formats within the PDCCH that are used for different TTI Types in the PDCCH. Alternatively, the minimum value within the maximum number of HARQ processes for all TTI Types may be selected as the reference maximum number of DL HARQ processes. According to another alternative, the reference maximum number of HARQ processes may correspond to a number between the maximum HARQ process number for TTI Type 1 and TTI Type 2. As an example, the maximum number of DL HARQ processes may be 8 for the TTI Type 1 and may be 12 for the TTI Type 2. Therefore, based on the proposed method, the largest value, 12, may be determined as a reference maximum number of DL HARQ processes applied for HARQ operations of both TTI Type 1 and TTI Type 2, or, in the alternative, the smallest value, 8, may be determined as a reference maximum number of DL HARQ processes applied for HARQ operations of both TTI Types 1 and 2. Moreover, once the TTI Type 2 is configured for a given UE, the number of bits of "HARQ process number" field in DCI format may be extended, for example from 3 to 4, for scheduling data transmission in not only Type 2 but also in TTI Type 1.

The above embodiment is based on the assumption that the NACK rate is typically about 10%, and therefore that the maximum number of HARQ process slots in a soft buffer may not be necessary.

Capability Sharing across Different Configurations

According to one embodiment, a base station may configure a first set of HARQ processes and a second set of HARQ processes. The first set of HARQ processes may be associated with a first processing capability (soft buffer space or partitions) and a second set of HARQ processes may be associated with a second processing capability (soft buffer space or partitions). The first and second set of HARQ processes may overlap. The first processing capability may correspond to a size of the soft buffer available for utilization by the first set of HARQ processes, and second processing capability may correspond to a size of the soft buffer available for utilization by the second set of HARQ processes. Some of the soft buffer processing capability may be shared between the different sets of HARQ processes. If the overall processing capabilities across the different sets of HARQ processes exceeds a total amount of soft buffer size available at the UE, the UE may use overbooking techniques to manage the soft buffer.

For example, a first set of HARQ processes with indices {0, 1, 2 . . . 7} may be associated with a first processing capability (e.g. such as soft buffer allocated for a TTI Type 1), and a second set of HARQ processes with indices {5, 6, 7 . . . 16} may be associated with a second processing capability (e.g. such as soft buffer allocated for TTI Type 2). In the case of overlapped HARQ processes, for example for HARQ processes {5,6,7}, the processing capability (e.g. soft buffer partitions) may be shared.

The set of HARQ processes may be associated with a control resource set, or each control resource set may be associated with a set of HARQ processes.

The overall processing capability (e.g. maximum number of HARQ processes) may be configured by base station based on the UE's capability signaling. A UE may, for example signal an indication of a first number of HARQ processes with a first soft buffer processing capability, a second number of HARQ processes with a second soft buffer processing capability, and a third number of HARQ processes with simultaneous support for the first and second soft buffer processing capabilities. The base station may, based on the indication, explicitly configure the number of HARQ processes for the UE. By way of example, the base station may configure the number of HARQ processes associated with a particular capability, and may explicitly signal an indication of the number of HARQ processes to the UE. For example, the base station may associate a HARQ process with the following capabilities of the UE: a maximum number of transport block bits, a Type of TTI, or a reference Type of TTI. Based on this association, the base station may configure the number of HARQ processes, and may explicit indicate such configuration to the UE. A UE can then determine the type of soft buffer processing capability associated with the corresponding HARQ process.

Another important attribute of the above embodiment is to make the transmitter side operation transparent to the processing capability, especially for the case, where a single packet could be scheduled/rescheduled from one capability to the other (e.g. when a single HARQ process is shared between the two different capabilities). In this case, the rate-matching operation (for example) at the transmitter should be defined based on a reference configuration, which can be applied commonly to packets transmitted by different capabilities. For instance, the number of bits in the virtual circular buffer for a transport block may be defined based on a first reference value (e.g. Nsoft) indicated by the UE, and a second reference maximum number of HARQ processes determined based on a plurality of maximum number of HARQ processes for different TTI Types.

While the focus of the discussion is on the downlink, the same principles apply to uplink and sidelink as well.

In some embodiments, the electronic device(s), network(s), system(s), chip(s) or component(s), or portions or implementations thereof, of FIGS. 1-7, or some other figure herein may be configured to perform one or more processes, techniques, or methods as described herein in relation to embodiments, or portions thereof.

EXAMPLES

Example 1 includes a device of a User Equipment (UE), the device including: a soft buffer including a plurality of soft buffer partitions to store a plurality of soft bits for a number of hybrid automatic retransmission request (HARQ) processes, wherein the number of HARQ processes includes first HARQ processes corresponding to a first Time Transmission Interval (TTI) Type of a first duration (TTI Type 1), and second HARQ processes corresponding to a second TTI Type of a second duration (TTI Type 2) shorter than the first duration; and processing circuitry to communicate with a base station in a cellular network, the processing circuitry further to effect a dynamic switching between a TTI Type 1 communication mode and a TTI Type 2 communication mode, and to selectively access the soft buffer partitions to perform, based on the switching, at least one of the first HARQ processes corresponding to TTI Type 1 and the second HARQ processes corresponding to TTI Type 2.

Example 2 includes the subject matter of Example 1, and optionally, wherein the soft buffer includes a first soft buffer portion for the first HARQ processes, and a second soft buffer portion for the second HARQ processes, the first soft buffer portion and the second soft buffer portion being non-overlapping.

Example 3 includes the subject matter of Example 2, and optionally, wherein the processing circuitry is to encode a signal including UE capability information based on a size of at least one of the first soft buffer portion and the second soft buffer portion, and to cause the UE to transmit the signal to the base station.

Example 4 includes the subject matter of Example 2, and optionally, wherein a size of the second soft buffer portion corresponds to a scaled size configured based on a fixed size value multiplexed by a size of the first soft buffer portion.

Example 5 includes the subject matter of Example 1, and optionally, wherein the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2.

Example 6 includes the subject matter of Example 5, and optionally, wherein: the second HARQ process of TTI Type 2 includes a plurality of second HARQ processes of TTI Type 2; the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions; and the first HARQ process index of the first HARQ process of TTI Type 1 and the second HARQ process indices of the second HARQ process of TTI Type 2 are based on a maximum number of HARQ process indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 2}$.

Example 7 includes the subject matter of Example 6, and optionally, wherein $Y_i$ is given by:

$$Y_i = (i-1) \times M_{DL\_HARQ}^{TTI\ type\ 1} \times X$$

where i=1, . . . , $[M_{DL\_HARQ}^{TTI\ type\ 2}/M_{DL\_HARQ}^{TTI\ type\ 1}]$ and $M_{DL\_HARQ}^{TTI\ type\ 2} > M_{DL\_HARQ}^{TTI\ type\ 1}$ and X is the first HARQ process index corresponding to the first HARQ process of TTI Type 1.

Example 8 includes the subject matter of Example 6, and optionally, wherein $Y_i$ is given by:

$$Y_i = (M_{DL\_HARQ}^{TTI\ type\ 1} - X + 1) \times [M_{DL\_HARQ}^{TTI\ type\ 2}/M_{DL\_HARQ}^{TTI\ type\ 1}] + i$$

where i=0, 1, . . . , $[M_{DL\_HARQ}^{TTI\ type\ 2}/M_{DL\_HARQ}^{TTI\ type\ 1}]-1$ and X is the first HARQ process index corresponding to the first HARQ process of TTI Type 1.

Example 9 includes the subject matter of Example 6, and optionally, wherein the processing circuitry is further to decode a Downlink Control Information signal (DCI) comprising an information element (IE) including information on a which of the second HARQ process indices are to be used in a retransmission that is according to the first HARQ process of TTI Type 1.

Example 10 includes the subject matter of Example 9, and optionally, wherein the IE has a number of bits N provided by $N=[\log_2(i)]$, wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

Example 11 includes the subject matter of Example 2, and optionally, wherein the first soft buffer portion is a soft buffer portion of size N1, the second soft buffer portion is a soft buffer portion of size N2, the soft buffer further including a third soft buffer portion of size N3, wherein the processing circuitry is to dynamically share the third soft buffer portion between the first HARQ processes of TTI Type 1 and the second HARQ processes of TTI Type 2.

Example 12 includes the subject matter of Example 11, and optionally, wherein r1 is a weighing factor for the first soft buffer portion and r2 is a weighing factor for the second soft buffer portion, and wherein the processing circuitry is to: decode a signal from the base station including information on r1 and r2; determine N1, N2 and N3 based on r1 and r2 as follows: $N1=N\times r1$, $N2=N\times r2$, $N3=N-N1-N2$, where $0 \leq r1 < 1$, $0 \leq r2 < 1$ and $r1+r \leq 1$; and configure the first soft buffer portion, the second soft buffer portion and the third soft buffer portion based on N1, N2 and N3 respectively.

Example 13 includes the subject matter of Example 11, and optionally, wherein the processing circuitry is to determine, for the shared soft buffer portion, a HARQ processes scheduling for the first HARQ processes of TTI Type 1 and the second HARQ processes of TTI Type 2 based on a HARQ termination status for each of the first and second HARQ processes.

Example 14 includes the subject matter of Example 1, and optionally, wherein the processing circuitry is to decode a Downlink Control Information signal (DCI) from the base station, the DCI including a field including a number of bits based on a reference maximum number of HARQ processes determined from a first maximum number of HARQ processes corresponding to the first HARQ processes of TTI Type 1 and a second maximum number of HARQ processes corresponding to the second HARQ processes of TTI Type 2.

Example 15 includes the subject matter of Example 14, and optionally, wherein the reference maximum number of HARQ processes is equal to the first maximum number, the second maximum number, or a number in between the first maximum number and the second maximum number, and wherein the first maximum number and the second maximum number are different from one another.

Example 16 includes the subject matter of Example 1, and optionally, wherein the processing circuitry is to: encode a signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities, the information to allow the base station to configure the number of HARQ processes; cause transmission of the signal including the information on the indication to the base station; and decode a Downlink Control Information signal (DCI) from the base station including a field having a bitwidth, the bitwidth indicating, for each component carrier, a reference maximum number of HARQ processes.

Example 17 includes the subject matter of Example 1, and optionally, further including a radio frequency (RF) circuitry coupled to the processing circuitry, and a front end module coupled to the RF circuitry.

Example 18 includes the subject matter of Example 17, and optionally, further including one or more antennas coupled to the front end module, the device to transmit and receive signals by way of the one or more antennas.

Example 19 includes a product comprising one or more tangible computer-readable non-transitory storage media comprising computer-executable instructions operable to, when executed by at least one computer processor, cause the at least one computer processor to implement operations at a device of a User Equipment (UE), the operations comprising: communicating with a base station in a cellular network; dynamically switching between a TTI Type 1 communication mode and a TTI Type 2 communication mode; performing a number of a number of hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; and selectively accessing soft buffer partitions of a soft buffer of the device to perform, based on the switching, at least one of the first HARQ processes corresponding to TTI Type 1 and the second HARQ processes corresponding to TTI Type 2, wherein the soft buffer includes the soft buffer partitions to store a plurality of soft bits corresponding to the HARQ processes.

Example 20 includes the subject matter of Example 19, and optionally, wherein the soft buffer includes a first soft buffer portion for the first HARQ processes, and a second soft buffer portion for the second HARQ processes, the first soft buffer portion and the second soft buffer portion being non-overlapping.

Example 21 includes the subject matter of Example 20, and optionally, wherein the operations further include encoding a signal including UE capability information based on a size of at least one of the first soft buffer portion and the second soft buffer portion, and causing the UE to transmit the signal to the base station.

Example 22 includes the subject matter of Example 20, and optionally, wherein a size of the second soft buffer portion corresponds to a scaled size configured based on a fixed size value multiplexed by a size of the first soft buffer portion.

Example 23 includes the subject matter of Example 19, and optionally, wherein the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2.

Example 24 includes the subject matter of Example 23, and optionally, wherein: the second HARQ process of TTI Type 2 includes a plurality of second HARQ processes of TTI Type 2; the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions; and the first HARQ process index of the first HARQ process of TTI Type 1 and the second HARQ process indices of the second HARQ process of TTI Type 2 are based on a maximum number of HARQ process indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 2}$.

Example 25 includes the subject matter of Example 24, and optionally, wherein $Y_i$ is given by:

$$Y_i = (i-1) \times M_{DL\_HARQ}^{TTI\ type\ 1} + X$$

where $i=1, \ldots, [M_{DL\_HARQ}^{TTI\ type\ 2}/M_{DL\_HARQ}^{TTI\ type\ 1}]$ and $M_{DL\_HARQ}^{TTI\ type\ 2} > M_{DL\_HARQ}^{TTI\ type\ 1}$ and X is the first HARQ process index corresponding to the first HARQ process of TTI Type 1.

Example 26 includes the subject matter of Example 24, and optionally, wherein $Y_i$ is given by:

$$Y_i = (M_{DL\_HARQ}^{TTI\ type\ 1} - X + 1) \times [M_{DL\_HARQ}^{TTI\ type\ 2}/M_{DL\_HARQ}^{TTI\ type\ 1}] + i$$

where $i=0, 1, \ldots, [M_{DL\_HARQ}^{TTI\ type\ 2}/M_{DL\_HARQ}^{TTI\ type\ 1}]-1$ and X is the first HARQ process index corresponding to the first HARQ process of TTI Type 1.

Example 27 includes the subject matter of Example 24, and optionally, wherein the operations further include decoding a Downlink Control Information signal (DCI) comprising an information element (IE) including information on a which of the second HARQ process indices are to be used in a retransmission that is according to the first HARQ process of TTI Type 1.

Example 28 includes the subject matter of Example 27, and optionally, wherein the IE has a number of bits N provided by $N=[\log_2(i)]$, wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

Example 29 includes the subject matter of Example 20, and optionally, wherein the first soft buffer portion is a soft buffer portion of size N1, the second soft buffer portion is a soft buffer portion of size N2, the soft buffer further including a third soft buffer portion of size N3, wherein the operations further include dynamically sharing the third soft buffer portion between the first HARQ processes of TTI Type 1 and the second HARQ processes of TTI Type 2.

Example 30 includes the subject matter of Example 29, and optionally, wherein r1 is a weighing factor for the first soft buffer portion and r2 is a weighing factor for the second soft buffer portion, and wherein the operations further include: decoding a signal from the base station including information on r1 and r2; determining N1, N2 and N3 based on r1 and r2 as follows: N1=N×r1, N2=N×r2, N3=N−N1−N2 where $0 \le r1 < 1$, $0 \le r2 < 1$ and $r1 + r2 \le 1$; and configuring the first soft buffer portion, the second soft buffer portion and the third soft buffer portion based on N1, N2 and N3 respectively.

Example 31 includes the subject matter of Example 29, and optionally, wherein the operations further include determining, for the shared soft buffer portion, a HARQ processes scheduling for the first HARQ processes of TTI Type 1 and the second HARQ processes of TTI Type 2 based on a HARQ termination status for each of the first and second HARQ processes.

Example 32 includes the subject matter of Example 19, and optionally, wherein the operations further include decoding a Downlink Control Information signal (DCI) from the base station, the DCI including a field including a number of bits based on a reference maximum number of HARQ processes determined from a first maximum number of HARQ processes corresponding to the first HARQ processes of TTI Type 1 and a second maximum number of HARQ processes corresponding to the second HARQ processes of TTI Type 2.

Example 33 includes the subject matter of Example 32, and optionally, wherein the reference maximum number of HARQ processes is equal to the first maximum number, the second maximum number, or a number in between the first maximum number and the second maximum number, and wherein the first maximum number and the second maximum number are different from one another.

Example 34 includes the subject matter of Example 19, and optionally, wherein the operations further include: encoding a signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities, the information to allow the base station to configure the number of HARQ processes; causing transmission of the signal including the information on the indication to the base station; and decoding a Downlink Control Information signal (DCI) from the base station including a field having a bitwidth, the bitwidth indicating, for each component carrier, a reference maximum number of HARQ processes.

Example 35 includes a method to be performed at a device of a User Equipment (UE) comprising: communicating with a base station in a cellular network; dynamically switching between a TTI Type 1 communication mode and a TTI Type 2 communication mode; performing a number of a number of hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; and selectively accessing soft buffer partitions of a soft buffer of the device to perform, based on the switching, at least one of the first HARQ processes corresponding to TTI Type 1 and the second HARQ processes corresponding to TTI Type 2, wherein the soft buffer includes the soft buffer partitions to store a plurality of soft bits corresponding to the HARQ processes.

Example 36 includes the subject matter of Example 35, and optionally, wherein the soft buffer includes a first soft buffer portion for the first HARQ processes, and a second soft buffer portion for the second HARQ processes, the first soft buffer portion and the second soft buffer portion being non-overlapping.

Example 37 includes the subject matter of Example 36, and optionally, wherein the method further includes encoding a signal including UE capability information based on a size of at least one of the first soft buffer portion and the second soft buffer portion, and causing the UE to transmit the signal to the base station.

Example 38 includes the subject matter of Example 36, and optionally, wherein a size of the second soft buffer portion corresponds to a scaled size configured based on a fixed size value multiplexed by a size of the first soft buffer portion.

Example 39 includes the subject matter of Example 35, and optionally, wherein the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2.

Example 40 includes the subject matter of Example 39, and optionally, wherein: the second HARQ process of TTI Type 2 includes a plurality of second HARQ processes of TTI Type 2; the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions; and the first HARQ process index of the first HARQ process of TTI Type 1 and the second HARQ process indices of the second HARQ process of TTI Type 2 are based on a maximum number of HARQ process indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 2}$.

Example 41 includes the subject matter of Example 40, and optionally, wherein $Y_i$ is given by:

$$Y_i = (i-1) \times M_{DL\_HARQ}^{TTI\ type\ 1} + X$$

where $i=1, \ldots, [M_{DL\_HARQ}^{TTI\ type\ 2}/M_{DL\_HARQ}^{TTI\ type\ 1}]$ and $M_{DL\_HARQ}^{TTI\ type\ 2} > M_{DL\_HARQ}^{TTI\ type\ 1}$ and X is the first HARQ process index corresponding to the first HARQ process of TTI Type 1.

Example 42 includes the subject matter of Example 40, and optionally, wherein $Y_i$ is given by:

$$Y_i = (M_{DL\_HARQ}^{TTI\ type\ 1} - X + 1) \times [M_{DL\_HARQ}^{TTI\ type\ 2}/M_{DL\_HARQ}^{TTI\ type\ 1}] + i$$

where $i=0, 1, \ldots, [M_{DL\_HARQ}^{TTI\ type\ 2}/M_{DL\_HARQ}^{TTI\ type\ 1}] - 1$ and X is the first HARQ process index corresponding to the first HARQ process of TTI Type 1.

Example 43 includes the subject matter of Example 40, and optionally, wherein the method further includes decoding a Downlink Control Information signal (DCI) comprising an information element (IE) including information on a which of the second HARQ process indices are to be used in a retransmission that is according to the first HARQ process of TTI Type 1.

Example 44 includes the subject matter of Example 43, and optionally, wherein the IE has a number of bits N provided by $N=[\log_2(i)]$, wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

Example 45 includes the subject matter of Example 36, and optionally, wherein the first soft buffer portion is a soft buffer portion of size N1, the second soft buffer portion is a soft buffer portion of size N2, the soft buffer further including a third soft buffer portion of size N3, wherein the processing circuitry is to dynamically share the third soft buffer portion between the first HARQ processes of TTI Type 1 and the second HARQ processes of TTI Type 2.

Example 46 includes the subject matter of Example 35, and optionally, wherein r1 is a weighing factor for the first soft buffer portion and r2 is a weighing factor for the second soft buffer portion, and wherein the method further includes: decoding a signal from the base station including information on r1 and r2; determining N1, N2 and N3 based on r1 and r2 as follows: N1=N×r1, N2=N×r2, N3=N−N1−N2, where 0≤r1<1, 0≤r2<1 and r1+r2≤1; and configuring the first soft buffer portion, the second soft buffer portion and the third soft buffer portion based on N1, N2 and N3 respectively.

Example 47 includes the subject matter of Example 35, and optionally, wherein the method further includes determining, for the shared soft buffer portion, a HARQ processes scheduling for the first HARQ processes of TTI Type 1 and the second HARQ processes of TTI Type 2 based on a HARQ termination status for each of the first and second HARQ processes.

Example 48 includes the subject matter of Example 35, and optionally, wherein the method further includes decoding a Downlink Control Information signal (DCI) from the base station, the DCI including a field including a number of bits based on a reference maximum number of HARQ processes determined from a first maximum number of HARQ processes corresponding to the first HARQ processes of TTI Type 1 and a second maximum number of HARQ processes corresponding to the second HARQ processes of TTI Type 2.

Example 49 includes the subject matter of Example 48, and optionally, wherein the reference maximum number of HARQ processes is equal to the first maximum number, the second maximum number, or a number in between the first maximum number and the second maximum number, and wherein the first maximum number and the second maximum number are different from one another.

Example 50 includes the subject matter of Example 35, and optionally, wherein the method further includes: encoding a signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities, the information to allow the base station to configure the number of HARQ processes; causing transmission of the signal including the information on the indication to the base station; and decoding a Downlink Control Information signal (DCI) from the base station including a field having a bitwidth, the bitwidth indicating, for each component carrier, a reference maximum number of HARQ processes.

Example 51 includes an apparatus including: means for communicating with a base station in a cellular network; means for dynamically switching between a TTI Type 1 communication mode and a TTI Type 2 communication mode; means for performing a number of a number of hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; and means for selectively accessing soft buffer partitions of a soft buffer of the device to perform, based on the switching, at least one of the first HARQ processes corresponding to TTI Type 1 and the second HARQ processes corresponding to TTI Type 2, wherein the soft buffer includes the soft buffer partitions to store a plurality of soft bits corresponding to the HARQ processes.

Example 52 includes the apparatus of Example 51, and optionally, wherein the soft buffer includes a first soft buffer portion for the first HARQ processes, and a second soft buffer portion for the second HARQ processes, the first soft buffer portion and the second soft buffer portion being non-overlapping.

Example 53 includes the apparatus of Example 51, and optionally, wherein the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2.

Example 54 includes the apparatus of Example 53, and optionally, wherein: the second HARQ process of TTI Type 2 includes a plurality of second HARQ processes of TTI Type 2; the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions; and the first HARQ process index of the first HARQ process of TTI Type 1 and the second HARQ process indices of the second HARQ process of TTI Type 2 are based on a maximum number of HARQ process indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 2}$.

Example 55 includes a device of a base station, the device including: memory; and processing circuitry coupled to the memory, the processing circuitry to: communicate with a User Equipment (UE) in a cellular network; perform, with the UE, hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; dynamically switch between a TTI Type 1 communication mode and a TTI Type 2 communication mode with the UE; encode a control signal to the UE including information to be used by the UE to configure a soft buffer thereof, the soft buffer including a plurality of soft buffer partitions to store a plurality of soft bits for the HARQ processes, wherein the HARQ processes include the first HARQ processes and the second HARQ processes; and cause transmission of the control signal to the UE.

Example 56 includes the subject matter of Example 55, and optionally, wherein the information is to be used by the UE to configure the soft buffer to include a first soft buffer portion for the first HARQ processes, and a second soft buffer portion for the second HARQ processes, the first soft buffer portion and the second soft buffer portion being non-overlapping.

Example 57 includes the subject matter of Example 56, and optionally, wherein the processing circuitry is to decode a signal from the UE including UE capability information based on a size of at least one of the first soft buffer portion and the second soft buffer portion, and to cause the UE to transmit the signal to the base station.

Example 58 includes the subject matter of Example 55, and optionally, wherein: the soft buffer partitions include respective shared partitions, each of the shared partitions being shared between paired HARQ process indices including a first HARQ process index corresponding to a first HARQ process of TTI Type 1 and a set $Y_i$ of second HARQ process indices corresponding to respective ones of the second HARQ processes of TTI Type 2, where i is an integer value from 1 to a maximum number of second HARQ process indices in said each of the shared partitions; and the processing circuitry is to: encode a Downlink Control Information signal (DCI) comprising an information element (IE) including information on which of the second HARQ process indices are to be used by the UE in a retransmission to the base station that is according to the first HARQ process; and cause transmission of the DCI to the UE.

Example 59 includes the subject matter of Example 58, and optionally, wherein the IE has a number of bits N provided by $N=[\log_2(i)]$, wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

Example 60 includes the subject matter of Example 56, and optionally, wherein: the first soft buffer portion is a soft buffer portion of size N1, the second soft buffer portion is a soft buffer portion of size N2, the soft buffer further including a third soft buffer portion of size N3; r1 is a weighing factor for the first soft buffer portion and r2 is a weighing factor for the second soft buffer portion, r1 and r2 to be used by the UE to determine N1, N2 and N3 as follows: N1=N×r1, N2=N×r2, N3=N−N1−N2 where $0 \leq r1 < 1$, $0 \leq r2 < 1$ and $r1+r2 \leq 1$; the processing circuitry is to: encode a signal including information on r1 and r2; and cause transmission of the signal including the information on r1 and r2 to the UE for the UE to determine N1, N2 and N3 based on r1 and r2.

Example 61 includes the subject matter of Example 60, and optionally, wherein the processing circuitry is to determine r1 and r2 based on TTI Type 1 and TTI Type 2.

Example 62 includes the subject matter of Example 55, and optionally, wherein the processing circuitry is to encode a Downlink Control Information signal (DCI) to the UE, the DCI including a field including a number of bits based on a reference maximum number of HARQ processes determined from a first maximum number of HARQ processes corresponding to the first HARQ processes of TTI Type 1 and a second maximum number of HARQ processes corresponding to the second HARQ processes of TTI Type 2.

Example 63 includes the subject matter of Example 62, and optionally, wherein the reference maximum number of HARQ processes is equal to the first maximum number, the second maximum number, or a number in between the first maximum number and the second maximum number, and wherein the first maximum number and the second maximum number are different from one another.

Example 64 includes the subject matter of Example 55, and optionally, wherein the control signal if a first control signal, and the processing circuitry is to: decode a second control signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities; determine, based on the information in the second control signal, a reference maximum number of HARQ processes for each component carrier; encode a Downlink Control Information signal (DCI) from the base station including a field having a bitwidth, the bitwidth indicating, for each component carrier, the reference maximum number of HARQ processes; and cause transmission of the DCI to the UE.

Example 65 includes the subject matter of Example 55, and optionally, further including a radio frequency (RF) circuitry coupled to the processing circuitry, and a front end module coupled to the RF circuitry.

Example 66 includes the subject matter of Example 65, and optionally, further including one or more antennas coupled to the front end module, the device to transmit and receive signals by way of the one or more antennas.

Example 67 includes a product comprising one or more tangible computer-readable non-transitory storage media comprising computer-executable instructions operable to, when executed by at least one computer processor, cause the at least one computer processor to implement operations at a device of a base station, the operations comprising: communicating with a User Equipment (UE) in a cellular network; performing, with the UE, hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; dynamically switching between a TTI Type 1 communication mode and a TTI Type 2 communication mode with the UE; encoding a control signal to the UE including information to be used by the UE to configure a soft buffer thereof, the soft buffer including a plurality of soft buffer partitions to store a plurality of soft bits for the HARQ processes, wherein the HARQ processes include the first HARQ processes and the second HARQ processes; and causing transmission of the control signal to the UE.

Example 68 includes the subject matter of Example 67, and optionally, wherein the information is to be used by the UE to configure the soft buffer to include a first soft buffer portion for the first HARQ processes, and a second soft buffer portion for the second HARQ processes, the first soft buffer portion and the second soft buffer portion being non-overlapping.

Example 69 includes the subject matter of Example 68, and optionally, wherein the operations further include decoding a signal from the UE including UE capability information based on a size of at least one of the first soft buffer portion and the second soft buffer portion, and to cause the UE to transmit the signal to the base station.

Example 70 includes the subject matter of Example 67, and optionally, wherein: the soft buffer partitions include respective shared partitions, each of the shared partitions being shared between paired HARQ process indices including a first HARQ process index corresponding to a first HARQ process of TTI Type 1 and a set $Y_i$ of second HARQ process indices corresponding to respective ones of the second HARQ processes of TTI Type 2, where i is an integer value from 1 to a maximum number of second HARQ process indices in said each of the shared partitions; and the operations further include: encoding a Downlink Control Information signal (DCI) comprising an information element (IE) including information on which of the second HARQ process indices are to be used by the UE in a retransmission to the base station that is according to the first HARQ process; and causing transmission of the DCI to the UE.

Example 71 includes the subject matter of Example 70, and optionally, wherein the IE has a number of bits N provided by N=[$\log_2(i)$], wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

Example 72 includes the subject matter of Example 68, and optionally, wherein: the first soft buffer portion is a soft buffer portion of size N1, the second soft buffer portion is a soft buffer portion of size N2, the soft buffer further including a third soft buffer portion of size N3; r1 is a weighing factor for the first soft buffer portion and r2 is a weighing factor for the second soft buffer portion, r1 and r2 to be used by the UE to determine N1, N2 and N3 as follows: N1=N×r1, N2=N×r2, N3=N−N1−N2, where 0≤r1<1, 0≤r2<1 and r1+r2≤1; and the operations further include: encoding a signal including information on r1 and r2; and causing transmission of the signal including the information on r1 and r2 to the UE for the UE to determine N1, N2 and N3 based on r1 and r2.

Example 73 includes the subject matter of Example 72, and optionally, wherein the operations further include determining r1 and r2 based on TTI Type 1 and TTI Type 2.

Example 74 includes the subject matter of Example 67, and optionally, wherein the processing circuitry is to encode a Downlink Control Information signal (DCI) to the UE, the DCI including a field including a number of bits based on a reference maximum number of HARQ processes determined from a first maximum number of HARQ processes corresponding to the first HARQ processes of TTI Type 1 and a second maximum number of HARQ processes corresponding to the second HARQ processes of TTI Type 2.

Example 75 includes the subject matter of Example 74, and optionally, wherein the reference maximum number of HARQ processes is equal to the first maximum number, the second maximum number, or a number in between the first maximum number and the second maximum number, and wherein the first maximum number and the second maximum number are different from one another.

Example 76 includes the subject matter of Example 67, and optionally, wherein the control signal if a first control signal, and the operations further include: decoding a second control signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities; determining, based on the information in the second control signal, a reference maximum number of HARQ processes for each component carrier; encoding a Downlink Control Information signal (DCI) from the base station including a field having a bitwidth, the bitwidth indicating, for each component carrier, the reference maximum number of HARQ processes; and causing transmission of the DCI to the UE.

Example 77 includes a method to be performed at a device of a Base station comprising: communicating with a User Equipment (UE) in a cellular network; performing, with the UE, hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; dynamically switching between a TTI Type 1 communication mode and a TTI Type 2 communication mode with the UE; encoding a control signal to the UE including information to be used by the UE to configure a soft buffer thereof, the soft buffer including a plurality of soft buffer partitions to store a plurality of soft bits for the HARQ processes, wherein the HARQ processes include the first HARQ processes and the second HARQ processes; and causing transmission of the control signal to the UE.

Example 78 includes the subject matter of Example 77, and optionally, wherein the information is to be used by the UE to configure the soft buffer to include a first soft buffer portion for the first HARQ processes, and a second soft buffer portion for the second HARQ processes, the first soft buffer portion and the second soft buffer portion being non-overlapping.

Example 79 includes the subject matter of Example 78, and optionally, further including decoding a signal from the UE including UE capability information based on a size of at least one of the first soft buffer portion and the second soft buffer portion, and to cause the UE to transmit the signal to the base station.

Example 80 includes the subject matter of Example 77, and optionally, wherein: the soft buffer partitions include respective shared partitions, each of the shared partitions being shared between paired HARQ process indices including a first HARQ process index corresponding to a first HARQ process of TTI Type 1 and a set $Y_i$ of second HARQ process indices corresponding to respective ones of the second HARQ processes of TTI Type 2, where i is an integer value from 1 to a maximum number of second HARQ process indices in said each of the shared partitions; and the method further includes: encoding a Downlink Control Information signal (DCI) comprising an information element (IE) including information on which of the second HARQ process indices are to be used by the UE in a retransmission to the base station that is according to the first HARQ process; and causing transmission of the DCI to the UE.

Example 81 includes the subject matter of Example 80, and optionally, wherein the IE has a number of bits N provided by $N=[\log_2(i)]$, wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

Example 82 includes the subject matter of Example 78, and optionally, wherein: the first soft buffer portion is a soft buffer portion of size N1, the second soft buffer portion is a soft buffer portion of size N2, the soft buffer further including a third soft buffer portion of size N3; r1 is a weighing factor for the first soft buffer portion and r2 is a weighing factor for the second soft buffer portion, r1 and r2 to be used by the UE to determine N1, N2 and N3 as follows: N1=N×r1, N2=N×r2, N3=N−N1−N2 where $0 \le r1 < 1$, $0 \le r2 \le 1$ and $r1+r2 \le 1$; and the method further includes: encoding a signal including information on r1 and r2; and causing transmission of the signal including the information on r1 and r2 to the UE for the UE to determine N1, N2 and N3 based on r1 and r2.

Example 83 includes the subject matter of Example 82, and optionally, further including determining r1 and r2 based on TTI Type 1 and TTI Type 2.

Example 84 includes the subject matter of Example 77, and optionally, further including encoding a Downlink Control Information signal (DCI) to the UE, the DCI including a field including a number of bits based on a reference maximum number of HARQ processes determined from a first maximum number of HARQ processes corresponding to the first HARQ processes of TTI Type 1 and a second maximum number of HARQ processes corresponding to the second HARQ processes of TTI Type 2.

Example 85 includes the subject matter of Example 84, and optionally, wherein the reference maximum number of HARQ processes is equal to the first maximum number, the second maximum number, or a number in between the first maximum number and the second maximum number, and wherein the first maximum number and the second maximum number are different from one another.

Example 86 includes the subject matter of Example 77, and optionally, wherein the control signal if a first control signal, and the method further includes: decoding a second control signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities; determining, based on the information in the second control signal, a reference maximum number of HARQ processes for each component carrier; encoding a Downlink Control Information signal (DCI) from the base station including a field having a bitwidth, the bitwidth indicating, for each component carrier, the reference maximum number of HARQ processes; and causing transmission of the DCI to the UE.

Example 87 includes an apparatus of a base station, the apparatus including: means for communicating with a User Equipment (UE) in a cellular network; means for performing, with the UE, hybrid automatic retransmission request (HARQ) processes including first HARQ processes corresponding to a first Time Transmission Interval (TTI) Type of a first duration (TTI Type 1), and second HARQ processes corresponding to a second TTI Type of a second duration (TTI Type 2) shorter than the first duration; means for dynamically switching between a TTI Type 1 communication mode and a TTI Type 2 communication mode with the UE; means for encoding a control signal to the UE including information to be used by the UE to configure a soft buffer thereof, the soft buffer including a plurality of soft buffer partitions to store a plurality of soft bits for the HARQ processes, wherein the HARQ processes include the first HARQ processes and the second HARQ processes; and means for causing transmission of the control signal to the UE.

Example 88 includes the apparatus of Example 87, and optionally, wherein the information is to be used by the UE to configure the soft buffer to include a first soft buffer portion for the first HARQ processes, and a second soft buffer portion for the second HARQ processes, the first soft buffer portion and the second soft buffer portion being non-overlapping.

Example 89 includes the apparatus of Example 88, and optionally, further including means for decoding a signal from the UE including UE capability information based on a size of at least one of the first soft buffer portion and the second soft buffer portion, and to cause the UE to transmit the signal to the base station.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

What is claimed is:

1. A device of a New Radio (NR) User Equipment (UE), the device comprising:
   a radio frequency circuitry interface (RF circuitry interface); and
   processing circuitry coupled to the RF circuitry interface, the processing circuitry configured to:
      determine a maximum reference number of downlink (DL) hybrid automatic repeat request (HARQ) processes for HARQ retransmissions to a base station, the maximum reference number of DL HARQ processes being based on a duration of a Time Transmission Interval (TTI) Type for transmissions from the base station to the UE, wherein;
      the DL HARQ processes are of a number of HARQ processes wherein a soft buffer including a plurality of soft buffer partitions stores a plurality of soft bits for the number of HARQ processes;
      the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2;
      the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions; and
      the first HARQ process index of the first HARQ process of TTI Type 1 and the second HARQ process indices of the second HARQ process of TTI Type 2 are based on a maximum number of HARQ processes indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 1}$; and
   the processing circuitry is further configured to encode the HARQ retransmissions to the base station in a cellular network based on the maximum reference number of DL HARQ processes.

2. The device of claim 1, wherein:
   the number of HARQ processes includes first HARQ processes corresponding to a first Time Transmission Interval (TTI) Type of a first duration (TTI Type 1), and second HARQ processes corresponding to a second TTI Type of a second duration (TTI Type 2) shorter than the first duration; and
   the processing circuitry is further configured to effect a dynamic switching between a TTI Type 1 communication mode and a TTI Type 2 communication mode, and to selectively access the soft buffer partitions to perform, based on the switching, at least one of the first HARQ processes corresponding to TTI Type 1 and the second HARQ processes corresponding to TTI Type 2.

3. The device of claim 2, wherein the soft buffer includes a first soft buffer portion for the first HARQ processes, and a second soft buffer portion for the second HARQ processes, the first soft buffer portion and the second soft buffer portion being non-overlapping.

4. The device of claim 3, wherein:
   the first soft buffer portion is a soft buffer portion of size N1 and the second soft buffer portion is a soft buffer portion of size N2;
   the soft buffer further includes a third soft buffer portion of size N3;
   the processing circuitry is to dynamically share the third soft buffer portion between the first HARQ processes of TTI Type 1 and the second HARQ processes of TTI Type 2;
   r1 is a weighing factor for the first soft buffer portion and r2 is a weighing factor for the second soft buffer portion; and
   the processing circuitry is to:
      decode a signal from the base station including information on r1 and r2;
      determine N1, N2 and N3 based on r1 and r2 as follows:

$N1 = N \times r1$ $N2 = N \times r2$ $N3 = N - N1 - N2$ where $0 \leq r1 < 1$, $0 \leq r2 < 1$ and $r1 + r2 \leq 1$; and
      configure the first soft buffer portion, the second soft buffer portion and the third soft buffer portion based on N1, N2 and N3 respectively.

5. The device of claim 1, wherein $Y_i$ is given by:

$Y_i = (i-1) \times M_{DL\_HARQ}^{TTI\ type\ 1} + X$ where $i = 1, \ldots, [M_{DL\_HARQ}^{TTI\ type\ 2} / M_{DL\_HARQ}^{TTI\ type\ 1}]$ and $M_{DL\_HARQ}^{TTI\ type\ 2} > M_{DL\_HARQ}^{TTI\ type\ 1}$ and X is the first HARQ process index corresponding to the first HARQ process of TTI Type 1.

6. The device of claim 1, wherein $Y_i$ is given by:

$Y_i = (M_{DL\_HARQ}^{TTI\ type\ 1} - X + 1) \times [M_{DL\_HARQ}^{TTI\ type\ 2} / M_{DL\_HARQ}^{TTI\ type\ 1}] + i$ where $i = 0, 1, \ldots, [M_{DL\_HARQ}^{TTI\ type\ 2} / M_{DL\_HARQ}^{TTI\ type\ 1}] - 1$ and X is the first HARQ process index corresponding to the first HARQ process of TTI Type 1.

7. The device of claim 1, wherein the processing circuitry is further configured to decode a Downlink Control Information signal (DCI) comprising an information element (IE) including information on a which of the second HARQ process indices are to be used in a retransmission that is according to the first HARQ process of TTI Type 1.

8. The device of claim 7, wherein the IE has a number of bits N provided by $N = [\log_2(i)]$, wherein a first value of the number of bits N in the IE being equal to 0 or 1 is to indicate that a first one of the second HARQ process indices is to be used for retransmission, and wherein a second value of the number of bits N in the IE being equal to 1 or 0 is to indicate that a second one of the second HARQ process indices is to be used for retransmission, the second value of the bits being different from the first value of the bits.

9. The device of claim 1, wherein the processing circuitry is further configured to decode a Downlink Control Information signal (DCI) from the base station, the DCI including a field including a number of bits based on the reference maximum number of HARQ processes, the reference maximum number of HARQ processes being based on a first maximum number of HARQ processes corresponding to first HARQ processes of a TTI Type 1 and a second maximum number of HARQ processes corresponding to second HARQ processes of TTI Type 2.

10. The device of claim 9, wherein the reference maximum number of HARQ processes is equal to the first maximum number, the second maximum number, or a number in between the first maximum number and the second maximum number, and wherein the first maximum number and the second maximum number are different from one another.

11. The device of claim 1, wherein the processing circuitry is further configured to:
encode a signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities, the information to allow the base station to configure the number of HARQ processes;
cause transmission of the signal including the information on the indication to the base station; and
decode a Downlink Control Information signal (DCI) from the base station including a field having a bitwidth, the bitwidth indicating, for each component carrier, the reference maximum number of HARQ processes.

12. The device of claim 1, further including a radio frequency (RF) circuitry coupled to the processing circuitry, and a front end module coupled to the RF circuitry.

13. The device of claim 12, further including one or more antennas coupled to the front end module, the device to transmit and receive signals by way of the one or more antennas.

14. A product comprising one or more tangible computer-readable non-transitory storage media comprising computer-executable instructions operable to, when executed by a device of a New Radio (NR) User Equipment (UE), enable the device to implement operations at the UE, the operations comprising:
determining a maximum reference number of downlink (DL) hybrid automatic repeat request (HARQ) processes for HARQ retransmissions to a base station, the maximum reference number of DL HARQ processes being based on a duration of a Time Transmission Interval (TTI) Type for transmissions from the base station to the UE, wherein
the DL HARQ processes are of a number of HARQ processes wherein a soft buffer including a plurality of soft buffer partitions stores a plurality of soft bits for the number of HARQ processes;
the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2;
the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions;
the first HARQ process index of the first HARQ process of TTI Type 1 and the second HARQ process indices of the second HARQ process of TTI Type 2 are based on a maximum number of HARQ processes indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 1}$; and
encoding the HARQ retransmissions to the base station in a cellular network based on the maximum reference number of DL HARQ processes.

15. The product of claim 14, wherein:
the number of HARQ processes includes first HARQ processes corresponding to a first Time Transmission Interval (TTI) Type of a first duration (TTI Type 1), and second HARQ processes corresponding to a second TTI Type of a second duration (TTI Type 2) shorter than the first duration; and
the operations further comprise effecting a dynamic switching between a TTI Type 1 communication mode and a TTI Type 2 communication mode, and to selectively access the soft buffer partitions to perform, based on the switching, at least one of the first HARQ processes corresponding to TTI Type 1 and the second HARQ processes corresponding to TTI Type 2.

16. The product of claim 15, wherein the soft buffer includes a first soft buffer portion for the first HARQ processes, and a second soft buffer portion for the second HARQ processes, the first soft buffer portion and the second soft buffer portion being non-overlapping.

17. The product of claim 16, wherein:
the first soft buffer portion is a soft buffer portion of size N1 and the second soft buffer portion is a soft buffer portion of size N2;
the soft buffer further includes a third soft buffer portion of size N3;
wherein the third soft buffer portion is dynamically shared between the first HARQ processes of TTI Type 1 and the second HARQ processes of TTI Type 2;
r1 is a weighing factor for the first soft buffer portion and r2 is a weighing factor for the second soft buffer portion; and
the operations further include:
decoding a signal from the base station including information on r1 and r2;
determining N1, N2 and N3 based on r1 and r2 as follows:

$N1 = N \times r1$ $N2 = N \times r2$ $N3 = N - N1 - N2$ where $0 \le r1 < 1$, $0 \le r2 < 1$ and $r1 + r2 \le 1$; and
configuring the first soft buffer portion, the second soft buffer portion and the third soft buffer portion based on N1, N2 and N3 respectively.

18. The product of claim 14, the operations further comprising decoding a Downlink Control Information signal (DCI) from the base station, the DCI including a field including a number of bits based on the reference maximum number of HARQ processes, the reference maximum number of HARQ processes being based on a first maximum number of HARQ processes corresponding to first HARQ processes of a TTI Type 1 and a second maximum number of HARQ processes corresponding to second HARQ processes of TTI Type 2.

19. The product of claim 18, wherein the reference maximum number of HARQ processes is equal to the first maximum number, the second maximum number, or a number in between the first maximum number and the second maximum number, and wherein the first maximum number and the second maximum number are different from one another.

20. The product of claim 14, the operations further comprising:
encoding a signal including information, for each component carrier, on an indication of a maximum number of the first HARQ processes with a first soft buffer processing capability, of a maximum number of the second HARQ processes with a second soft buffer processing capability, and of a number of third HARQ processes with simultaneous support for the first and second soft buffer processing capabilities, the information to allow the base station to configure the number of HARQ processes; causing transmission of the signal including the information on the indication to the base station; and
decoding a Downlink Control Information signal (DCI) from the base station including a field having a bitwidth, the bitwidth indicating, for each component carrier, the reference maximum number of HARQ processes.

21. A device of a New Radio (NR) User Equipment (UE), the device including:
means for determining a maximum reference number of downlink (DL) hybrid automatic repeat request (HARQ) processes for HARQ retransmissions to a base station, the maximum reference number of DL HARQ processes being based on a duration of a Time Transmission Interval (TTI) Type for transmissions from the base station to the UE, wherein;
the DL HARQ processes are of a number of HARQ processes wherein a soft buffer including a plurality of soft buffer partitions stores a plurality of soft bits for the number of HARQ processes;
the soft buffer partitions include respective shared partitions, each of the shared partitions being shared between paired HARQ process indices including a first HARQ process index corresponding to a first HARQ process of TTI Type 1 and a second HARQ process index corresponding to a second HARQ process of TTI Type 2;
the second HARQ process index includes a set of second HARQ process indices $Y_i$ corresponding to respective ones of the second HARQ processes of TTI Type 2, where i is an integer value from 1 to a maximum number of second HARQ process indices in said each of the shared partitions;
the first HARQ process index of the first HARQ process of TTI Type 1 and the second HARQ process indices of the second HARQ process of TTI Type 2 are based on a maximum number of HARQ processes indices for the first HARQ process of TTI Type 1 $M_{DL\_HARQ}^{TTI\ type\ 1}$ and a maximum number of HARQ process indices for the second HARQ process of TTI Type 2 $M_{DL\_HARQ}^{TTI\ type\ 1}$; and
means for encoding the HARQ retransmissions to the base station in a cellular network based on the maximum reference number of DL HARQ processes.

22. The device of claim 21, wherein:
the number of HARQ processes includes first HARQ processes corresponding to a first Time Transmission Interval (TTI) Type of a first duration (TTI Type 1), and second HARQ processes corresponding to a second TTI Type of a second duration (TTI Type 2) shorter than the first duration; and
the device further including means to effect a dynamic switching between a TTI Type 1 communication mode and a TTI Type 2 communication mode, and to selectively access the soft buffer partitions to perform, based on the switching, at least one of the first HARQ processes corresponding to TTI Type 1 and the second HARQ processes corresponding to TTI Type 2.

* * * * *